(12) United States Patent
Wakazono et al.

(10) Patent No.: US 9,310,592 B2
(45) Date of Patent: Apr. 12, 2016

(54) ZOOM LENS AND IMAGE PICKUP APPARATUS INCLUDING THE SAME

(71) Applicant: CANON KABUSHIKI KAISHA, Tokyo (JP)

(72) Inventors: Tsuyoshi Wakazono, Utsunomiya (JP); Tomoyuki Nakamura, Utsunomiya (JP); Kazuya Shimomura, Utsunomiya (JP); Yu Inomoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 14/519,591

(22) Filed: Oct. 21, 2014

(65) Prior Publication Data

US 2015/0131164 A1    May 14, 2015

(30) Foreign Application Priority Data

Nov. 12, 2013  (JP) ................. 2013-234392

(51) Int. Cl.
*G02B 15/14* (2006.01)
*G02B 15/173* (2006.01)

(52) U.S. Cl.
CPC .................... *G02B 15/173* (2013.01)

(58) Field of Classification Search
CPC .................................................. G02B 15/173
USPC ........................................................ 359/684
See application file for complete search history.

(56) References Cited

U.S. PATENT DOCUMENTS 5,757,554 A  *  5/1998  Fukami ............... G02B 15/173
                                                    359/684

FOREIGN PATENT DOCUMENTS

JP        2004-341237 A        12/2004

* cited by examiner

*Primary Examiner* — James Jones
(74) *Attorney, Agent, or Firm* — Carter, DeLuca, Farrell & Schmidt, LLP

(57) ABSTRACT

A zoom lens includes, in order from an object side: a positive first lens unit that does not move for zooming and comprises a negative first sub-lens unit, a positive second sub-lens unit that moves during adjustment of a focal point, and a positive third sub-lens unit composed of at least one negative lens, and at least two positive lenses; a lens group including at least two lens units that move during zooming; an aperture stop; and a positive last lens unit that does not move for zooming. Focal lengths of the first lens unit, the first sub-lens unit, and the zoom lens at a wide angle end, imaging magnification of the last lens unit, average values of an Abbe constant for d-line of the at least one negative lens and of the at least two positive lenses are appropriately set.

8 Claims, 10 Drawing Sheets

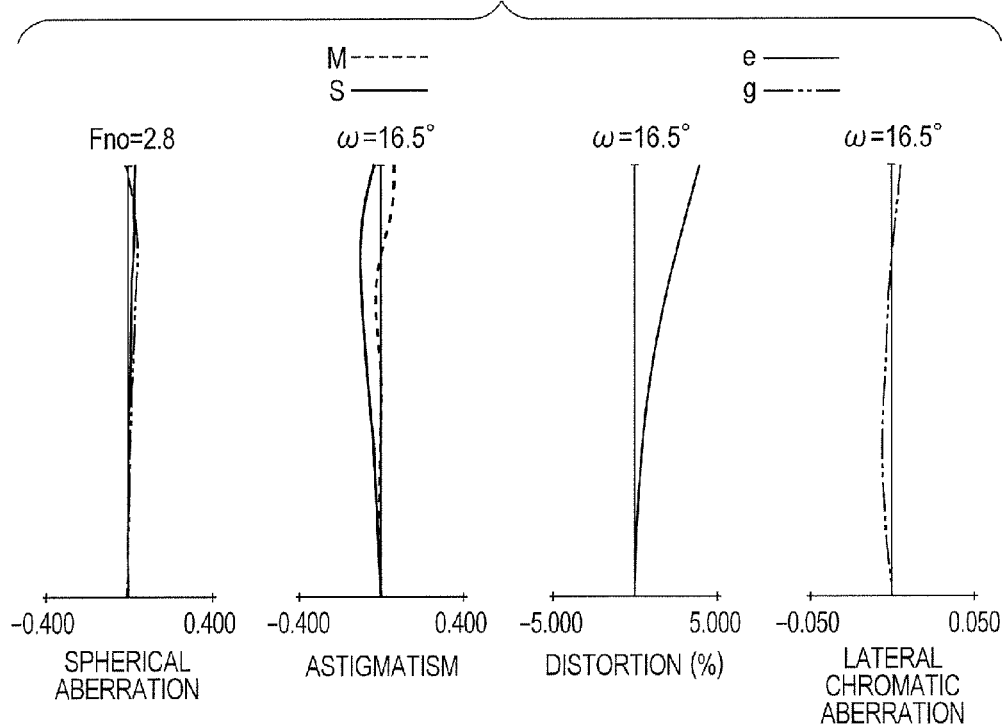
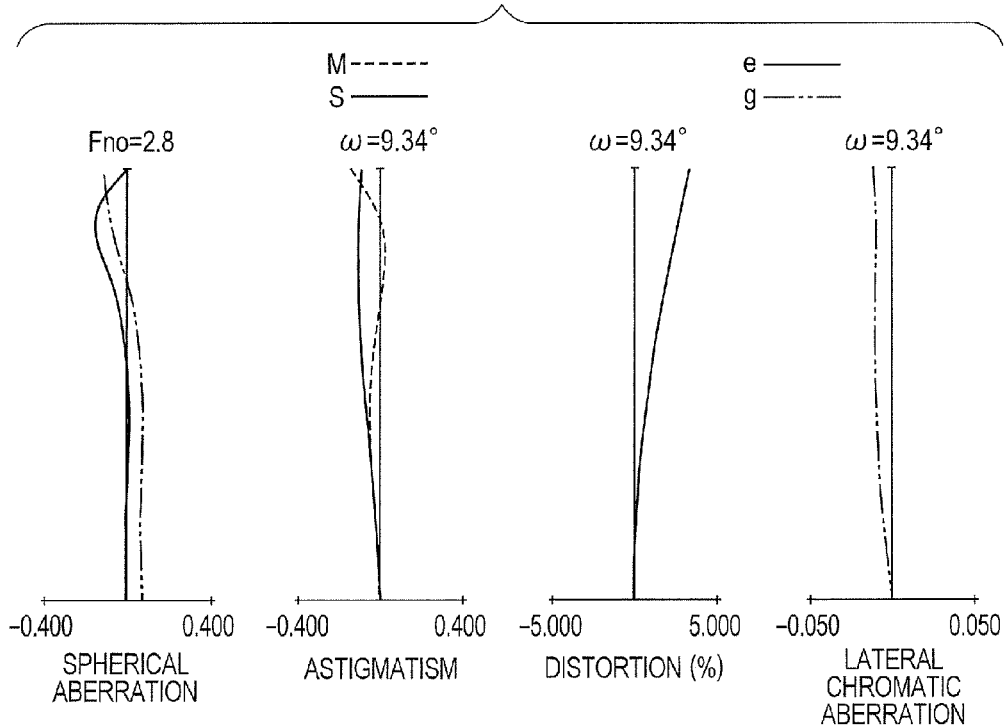

ZOOM LENS AND IMAGE PICKUP APPARATUS INCLUDING THE SAME

BACKGROUND OF THE INVENTION

1. Field of the Invention

The present invention relates to a zoom lens suitable for a television camera, a cinema camera, a video camera, a film camera, or a digital camera, and more particularly, to a zoom lens having high magnification, reduced size and weight, and high performance, and an image pickup apparatus including the same.

2. Description of the Related Art

A small and lightweight zoom lens having a wider angle of view, a higher zooming ratio, and higher optical performance has been demanded for an image pickup apparatus such as a television camera, a cinema camera, a film camera, or a video camera. In particular, image pickup devices such as a CCD and a CMOS, which are used in the television or cinema camera as a professional video photographing system, have a substantially equal resolution over the entire image pickup range. Therefore, the zoom lens using the image pickup device is required to have a substantially equal resolution from a center to a periphery of the screen, and required to be small and lightweight to support photographing modes that put a high priority on mobility and operability. In addition, in recent years, in order to obtain visual expression utilizing a shallow depth of filed and high sensitivity, a camera including a large-sized image pickup device has been developed, and a zoom lens responding to this camera has been demanded.

Hitherto, the following zoom lens has been known as a zoom lens having high magnification, reduced size and weight, and high optical performance. The zoom lens employs an inner-focusing system and includes, in order from an object side, a first lens unit having a positive refractive power that is fixed during zooming, a second lens unit having a negative refractive power that moves during the zooming, a third lens unit having a negative refractive power, for correction of an image plane, an aperture stop, and a lens unit having a positive refractive power that is fixed during the zooming. The first lens unit includes a first sub-lens unit having a negative refractive power, a second sub-lens unit having a positive refractive power, and a third sub-lens unit having a positive refractive power. The second sub-lens unit takes a role of the focusing.

For obtaining the high magnification, the reduction in size and weight, and the high performance in the zoom lens described above, the refractive powers and the structures of the lens units need to be appropriately set.

Each of zoom lenses disclosed in U.S. Pat. No. 5,757,554 and Japanese Patent Application Laid-Open No. 2004-341237 has a structure optimal for a camera including a relatively small image pickup device for a television camera, and hence has a problem in that the zoom lens is increased in size when being applied to a camera including a large-sized image pickup device.

SUMMARY OF THE INVENTION

In view of the foregoing, it is therefore an object of the present invention to provide a zoom lens which can realize both high magnification and reduction in size and weight and which can have satisfactory optical performance, and an image pickup apparatus including the same.

In order to attain the object described above, according to one embodiment of the present invention, there is provided a zoom lens including, in order from an object side to an image side: a first lens unit having a positive refractive power that does not move for zooming, the first lens unit comprising a first sub-lens unit having a negative refractive power, a second sub-lens unit having a positive refractive power that moves during adjustment of a focal point, and a third sub-lens unit having a positive refractive power; a lens group including at least two lens units that move during the zooming; an aperture stop; and a last lens unit having a positive refractive power that does not move for the zooming, in which the following conditional expressions are satisfied:

$$2.6 < f1/fw < 4.5$$

$$0.6 < |f11/f1| < 0.9$$

$$0.0 < |\beta r| < 1.5$$

where fw denotes a focal length at a wide angle end of the zoom lens, f1 denotes a focal length of the first lens unit, f11 denotes a focal length of the first sub-lens unit, and βr denotes imaging magnification of the last lens unit, in which the third sub-lens unit includes at least one negative lens, and at least two positive lenses, and in which the following conditional expression is satisfied:

$$2.0 < \nu 13pa/\nu 13na < 5.8$$

where ν13na denotes an average value of an Abbe constant of the at least one negative lens with a d-line as a reference, and ν13pa denotes an average value of Abbe constants of the at least two positive lenses with the d-line as the reference, and in which an Abbe constant νd with a d-line as a reference is defined by the following equation, $$\nu d = (nd-1)/(nF-nC)$$

where nd denotes a refractive index in the d-line, nC denotes a refractive index in a C-line, and nF denotes a refractive index in an F-line.

Further objects or other features of the present invention will become apparent from the following description of exemplary embodiments rendered with reference to the attached drawings.

According to one embodiment of the present invention, the zoom lens which can realize both the high magnification and the reduction in size and weight and which can have the satisfactory optical performance, and the image pickup apparatus including the same can be provided.

Further features of the present invention will become apparent from the following description of exemplary embodiments with reference to the attached drawings.

BRIEF DESCRIPTION OF THE DRAWINGS

FIG. 6B is an aberration diagram at a focal length of 50.0 mm in focus at object distance infinity of the zoom lens according to Embodiment 3 of the present invention.

FIG. 6C is an aberration diagram at a telephoto end in focus at object distance infinity of the zoom lens according to Embodiment 3 of the present invention.

DESCRIPTION OF THE EMBODIMENTS

Now, exemplary embodiments of the present invention are described in detail with reference to the attached drawings.

Figure 1:
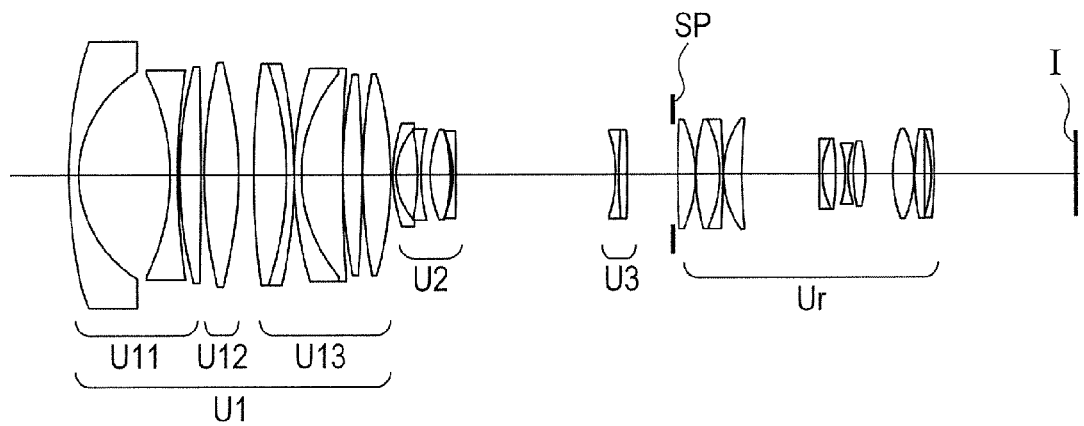
FIG. 1 is a cross-sectional view in focus at infinity at a wide angle end of a zoom lens according to Embodiment 1 of the present invention.
Figure 2A:
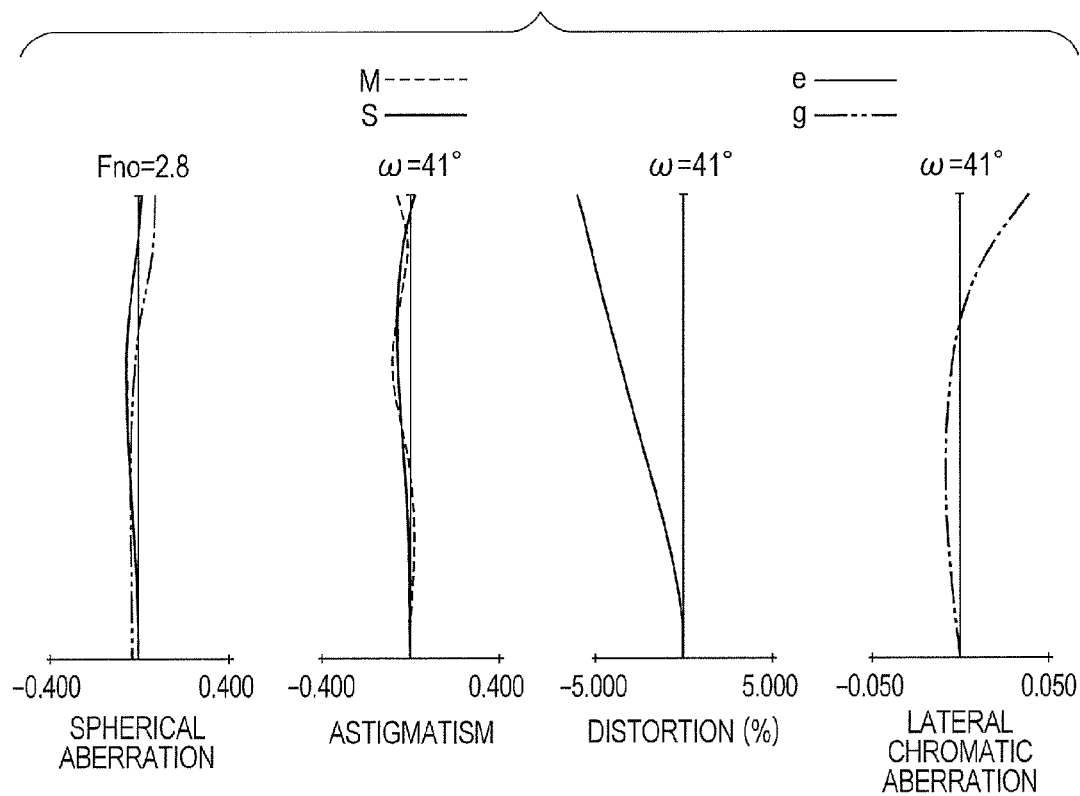
FIG. 2A is an aberration diagram at a wide angle end in focus at object distance infinity of the zoom lens according to Embodiment 1 of the present invention.
Figure 2B:
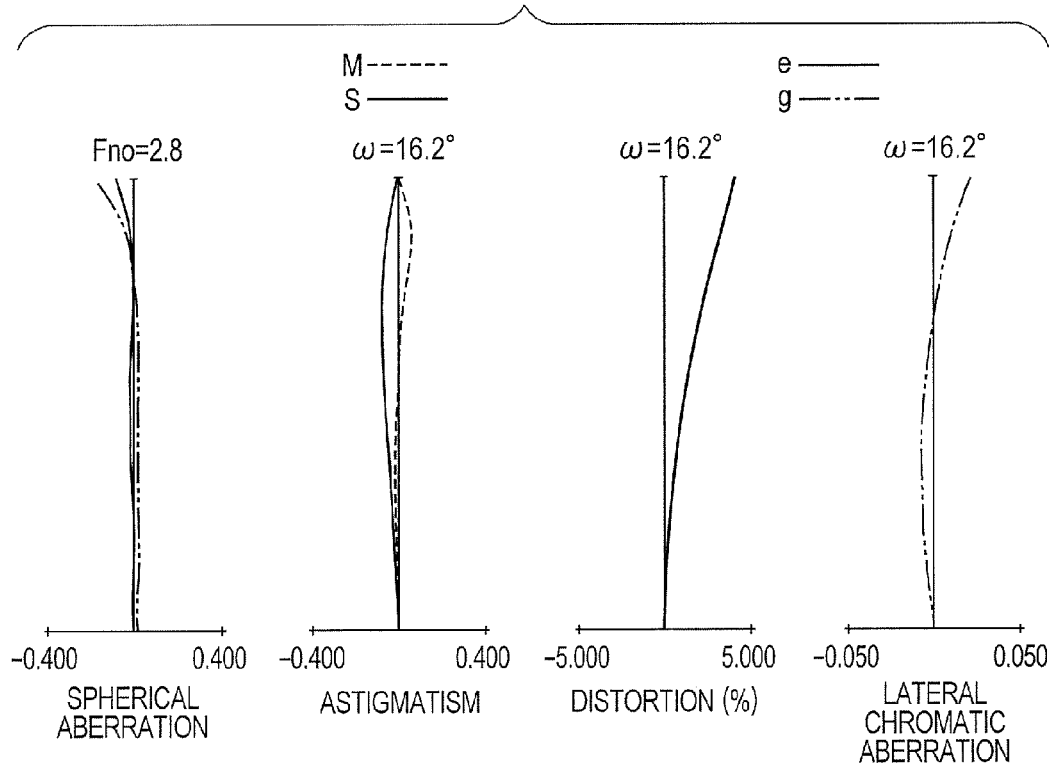
FIG. 2B is an aberration diagram at a focal length of 51.0 mm in focus at object distance infinity of the zoom lens according to Embodiment 1 of the present invention.
Figure 2C:
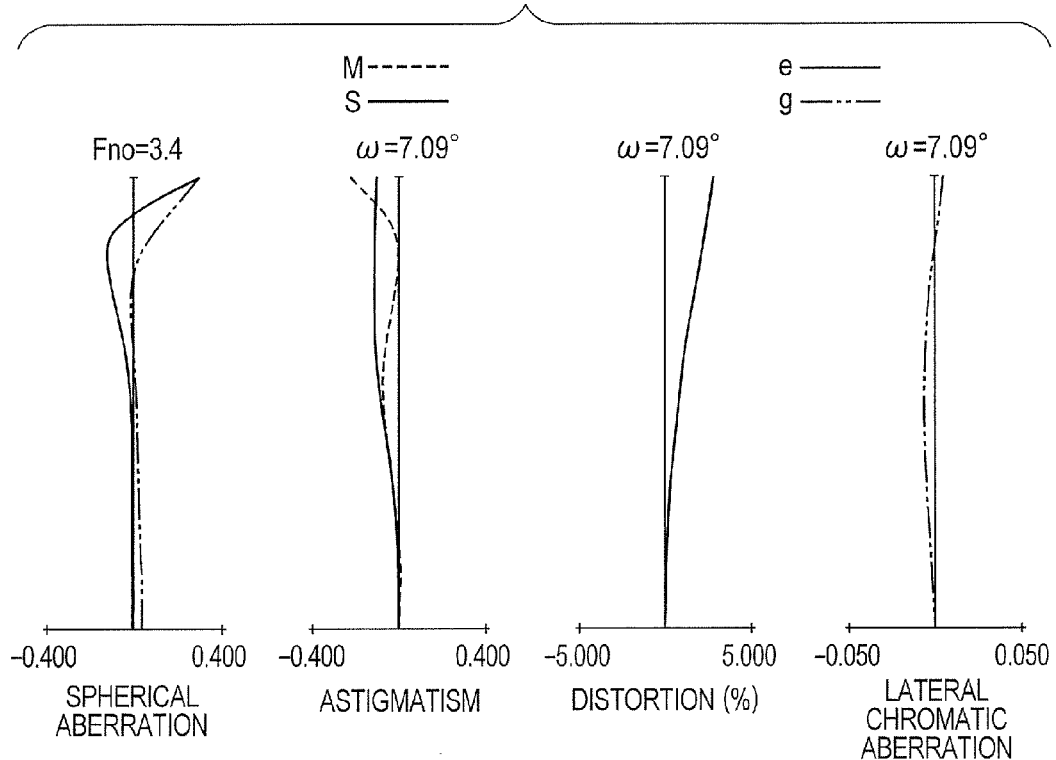
FIG. 2C is an aberration diagram at a telephoto end in focus at object distance infinity of the zoom lens according to Embodiment 1 of the present invention.

FIG. 1 is a lens cross-sectional view in focus made on an infinity object at a wide angle end of a zoom lens according to Numerical Embodiment 1 as Embodiment 1 of the present invention. FIG. 2A is a longitudinal aberration diagram at the wide angle end in focus made on the infinity object of the zoom lens of Numerical Embodiment 1. FIG. 2B is a longitudinal aberration diagram at a focal length of 51.0 mm in focus made on the infinity object of the zoom lens of Numerical Embodiment 1. FIG. 2C is a longitudinal aberration diagram at a telephoto end in focus made on the infinity object of the zoom lens of Numerical Embodiment 1.

Figure 3:
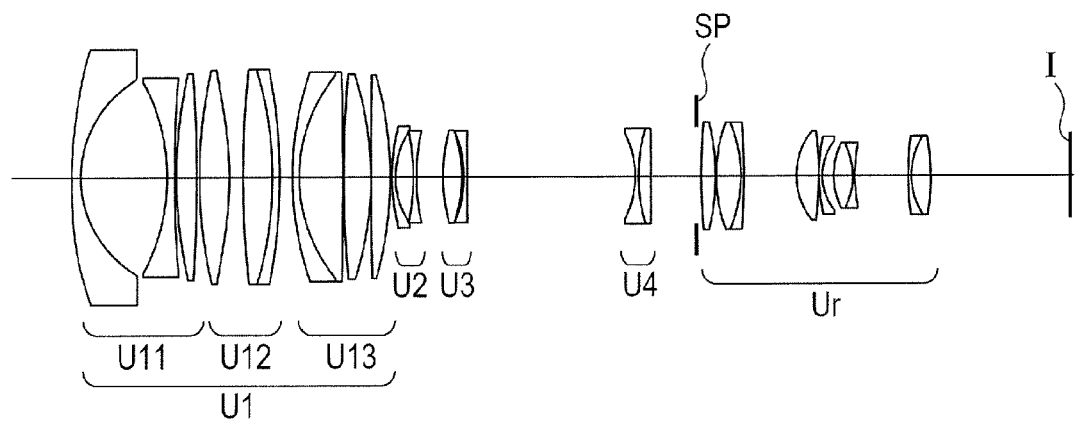
FIG. 3 is a cross-sectional view in focus at infinity at a wide angle end of a zoom lens according to Embodiment 2 of the present invention.
Figure 4A:
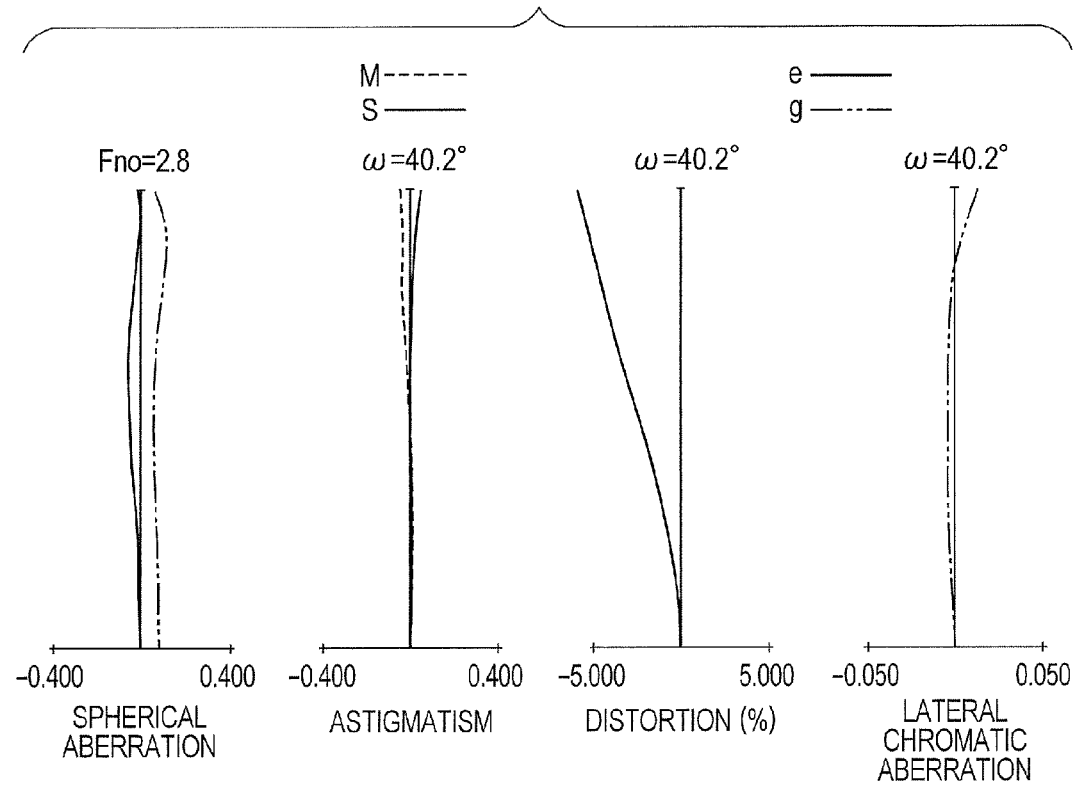
FIG. 4A is an aberration diagram at a wide angle end in focus at object distance infinity of the zoom lens according to Embodiment 2 of the present invention.
Figure 4B:
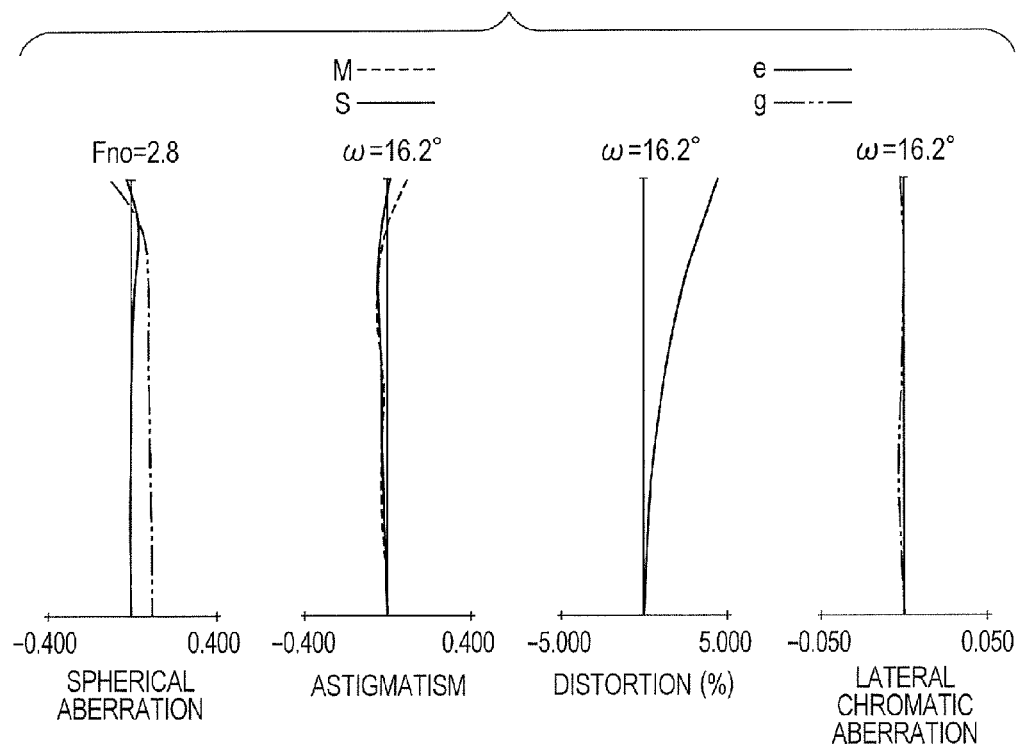
FIG. 4B is an aberration diagram at a focal length of 51.0 mm in focus at object distance infinity of the zoom lens according to Embodiment 2 of the present invention.
Figure 4C:
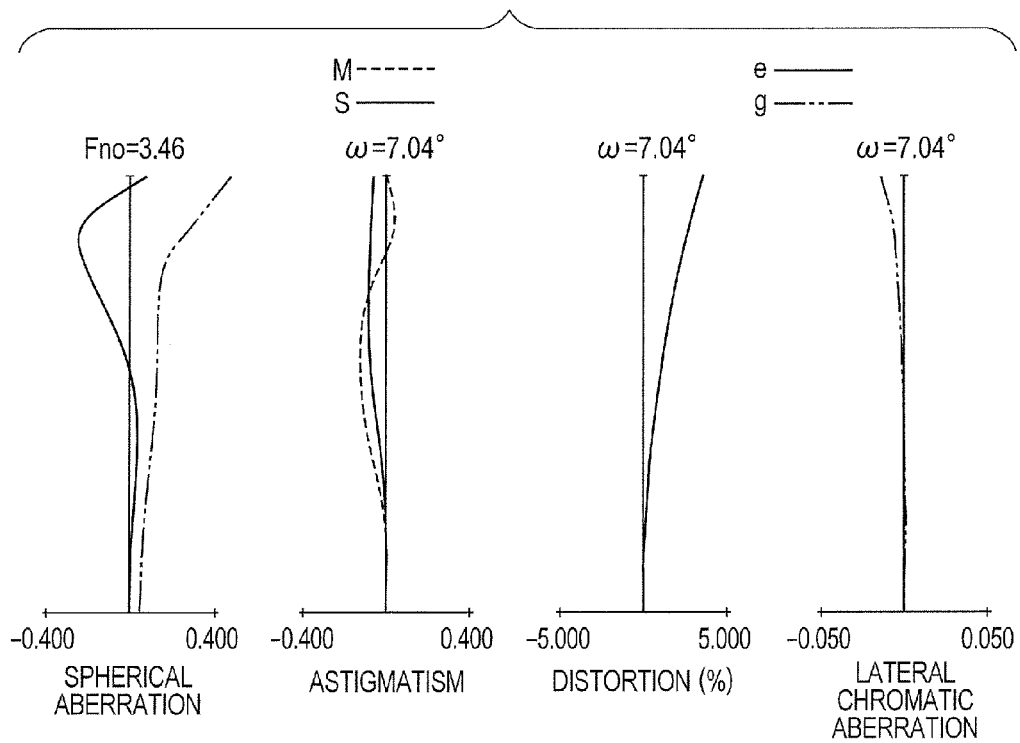
FIG. 4C is an aberration diagram at a telephoto end in focus at object distance infinity of the zoom lens according to Embodiment 2 of the present invention.

FIG. 3 is a lens cross-sectional view in focus made on an infinity object at a wide angle end of a zoom lens according to Numerical Embodiment 2 as Embodiment 2 of the present invention. FIG. 4A is a longitudinal aberration diagram at the wide angle end in focus made on the infinity object of the zoom lens of Numerical Embodiment 2. FIG. 4B is a longitudinal aberration diagram at a focal length of 51.0 mm in focus made on the infinity object of the zoom lens of Numerical Embodiment 2. FIG. 4C is a longitudinal aberration diagram at a telephoto end in focus made on the infinity object of the zoom lens of Numerical Embodiment 2.

Figure 5:
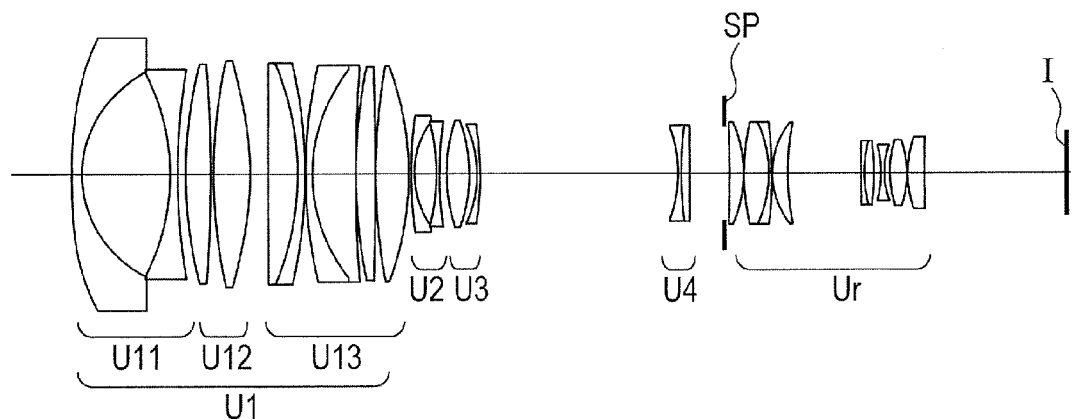
FIG. 5 is a cross-sectional view in focus at infinity at a wide angle end of a zoom lens according to Embodiment 3 of the present invention.
Figure 6A:
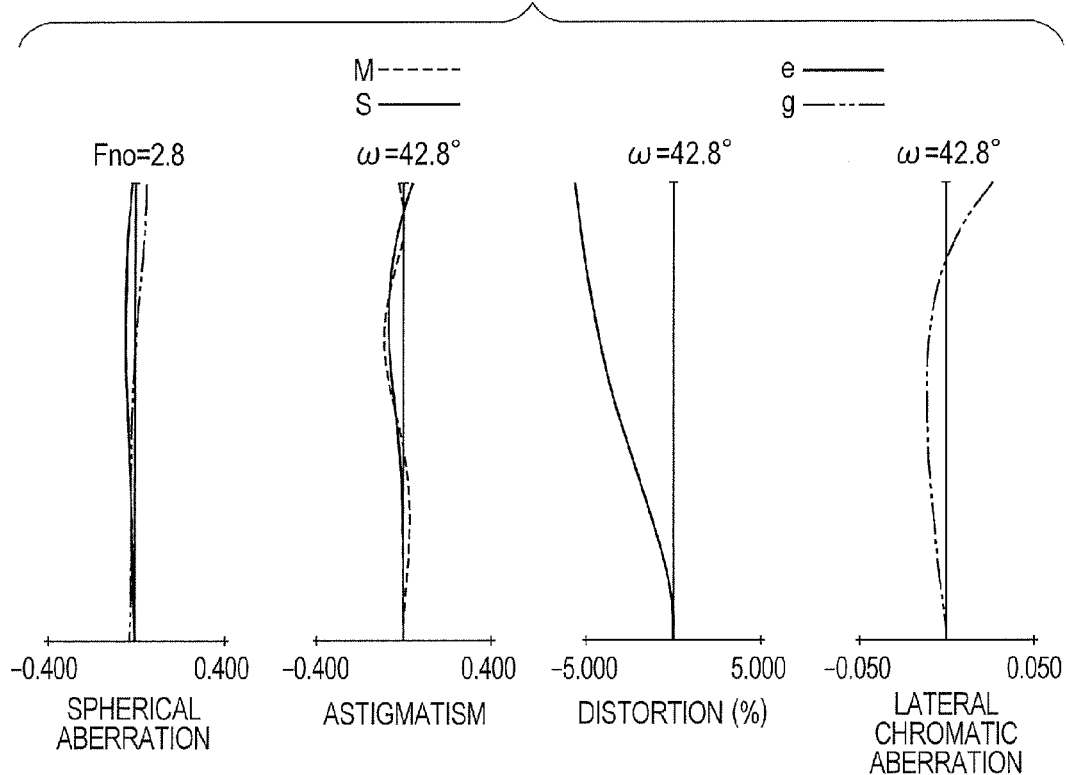
FIG. 6A is an aberration diagram at a wide angle end in focus at object distance infinity of the zoom lens according to Embodiment 3 of the present invention.

FIG. 5 is a lens cross-sectional view in focus made on an infinity object at a wide angle end of a zoom lens according to Numerical Embodiment 3 as Embodiment 3 of the present invention. FIG. 6A is a longitudinal aberration diagram at the wide angle end in focus made on the infinity object of the zoom lens of Numerical Embodiment 3. FIG. 6B is a longitudinal aberration diagram at a focal length of 50.0 mm in focus made on the infinity object of the zoom lens of Numerical Embodiment 3. FIG. 6C is a longitudinal aberration diagram at a telephoto end in focus made on the infinity object of the zoom lens of Numerical Embodiment 3.

Figure 7:
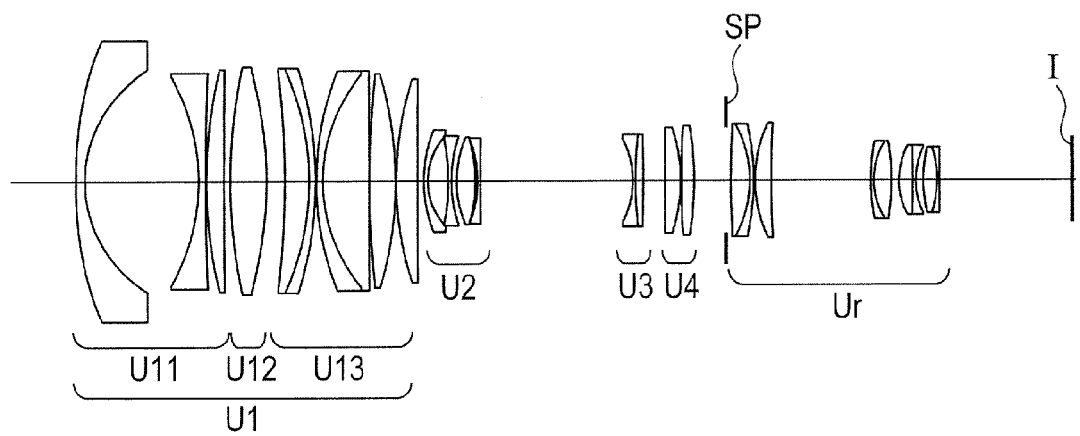
FIG. 7 is a cross-sectional view in focus at infinity at a wide angle end of a zoom lens according to Embodiment 4 of the present invention.
Figure 8A:
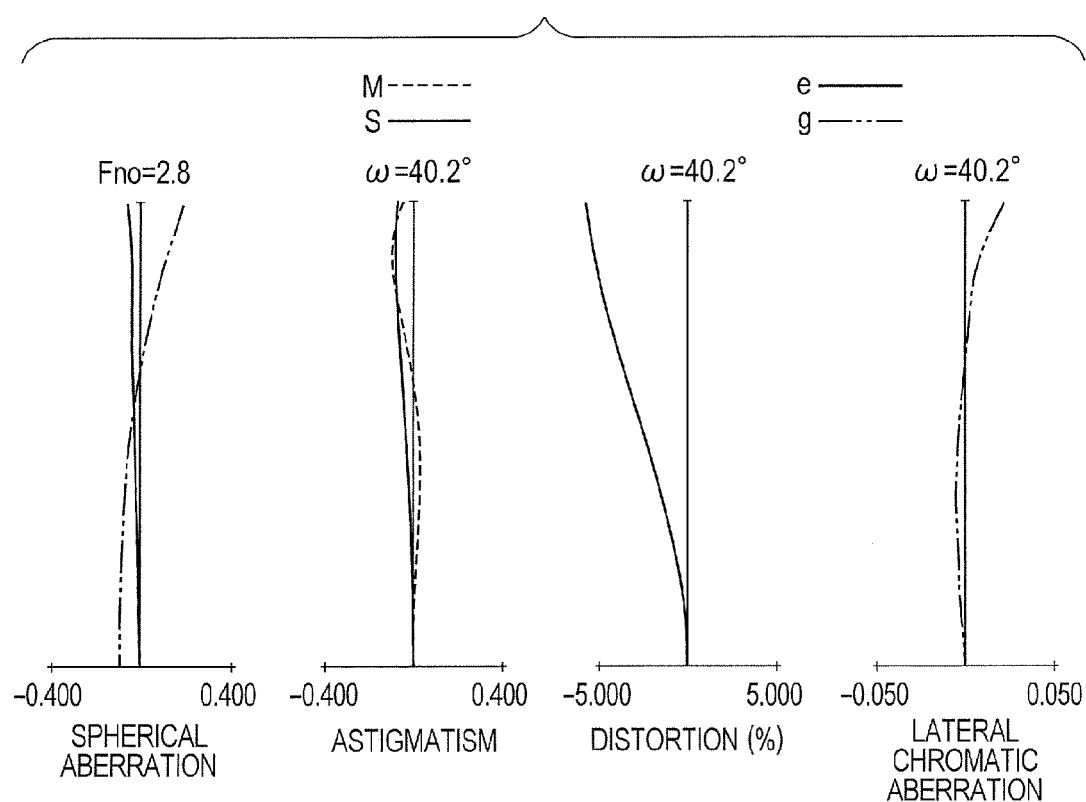
FIG. 8A is an aberration diagram at a wide angle end in focus at object distance infinity of the zoom lens according to Embodiment 4 of the present invention.
Figure 8B:
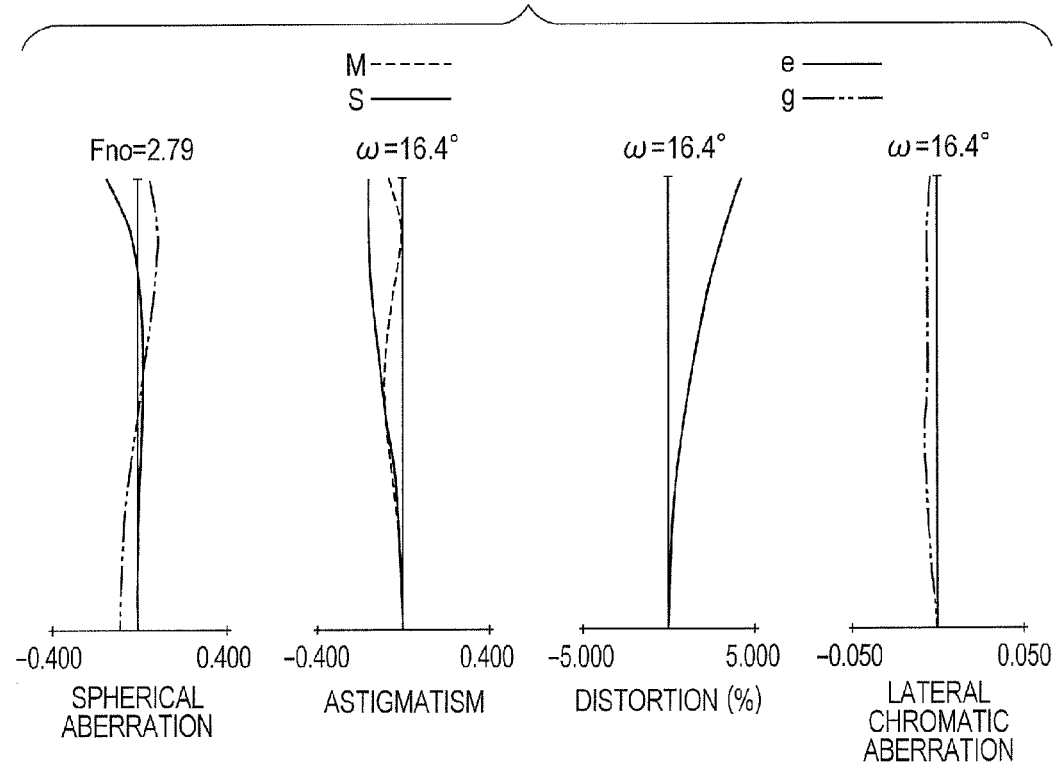
FIG. 8B is an aberration diagram at a focal length of 50.2 mm in focus at object distance infinity of the zoom lens according to Embodiment 4 of the present invention.
Figure 8C:
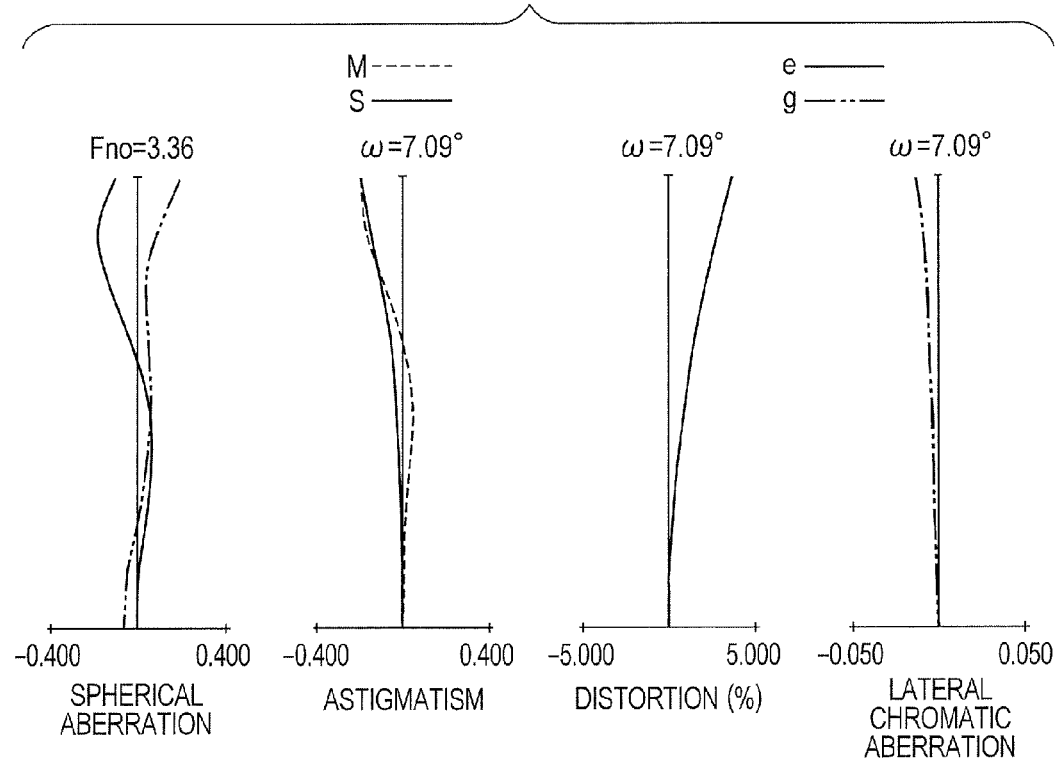
FIG. 8C is an aberration diagram at a telephoto end in focus at object distance infinity of the zoom lens according to Embodiment 4 of the present invention.

FIG. 7 is a lens cross-sectional view in focus made on an infinity object at a wide angle end of a zoom lens according to Numerical Embodiment 4 as Embodiment 4 of the present invention. FIG. 8A is a longitudinal aberration diagram at the wide angle end in focus made on the infinity object of the zoom lens of Numerical Embodiment 4. FIG. 8B is a longitudinal aberration diagram at a focal length of 50.2 mm in focus made on the infinity object of the zoom lens of Numerical Embodiment 4. FIG. 8C is a longitudinal aberration diagram at a telephoto end in focus made on the infinity object of the zoom lens of Numerical Embodiment 4.

In each longitudinal aberration diagram, spherical aberration is illustrated with respect to e-line (represented with a solid line) and g-line (represented with a chain double-dashed line). Astigmatism is illustrated on a meridional image plane (represented with a broken line) with respect to e-line and a sagittal image plane (represented with a solid line) with respect to e-line. Lateral chromatic aberration is illustrated with respect to g-line (represented with a chain double-dashed line). An F-number is represented by Fno and a half angle of field is represented by ω. In the longitudinal aberration diagram, spherical aberration, astigmatism, distortion, and lateral chromatic aberration are illustrated in scales of 0.4 mm, 0.4 mm, 5%, and 0.05 mm, respectively.

The zoom lens of the present invention includes, in order from an object side to an image side, a first lens unit having a positive refractive power that does not move for zooming, a movable zoom lens group including at least two lens units that move during the zooming, an aperture stop, and a relay lens unit for imaging having a positive refractive power that does not move for the zooming. The first lens unit includes a first sub-lens unit having a negative refractive power, a second sub-lens unit having a positive refractive power that moves during focusing (adjustment of a focal point), and a third sub-lens unit having a positive refractive power. In this case, the following conditional expressions are satisfied:

$$2.6 < f1/fw < 4.5 \qquad (1)$$

$$0.6 < |f11/f1| < 0.9 \qquad (2)$$

$$0.0 < |\beta r| < 1.5 \qquad (3)$$

where fw denotes a focal length at a wide angle end in the zoom lens (hereinafter referred to as "an entire lens system" as well), f1 denotes a focal length of the first lens unit, f11 denotes a focal length of the first sub-lens unit, and βr denotes imaging magnification of the relay lens unit located closer to an image side than the aperture stop.

The conditional expression (1) defines a range of a ratio of a focal length of a first lens unit U1 to the focal length at the wide angle end in the entire lens system, to thereby define the conditions for attaining the reduction in size and weight, the high magnification, and the high performance.

Figure 9A:
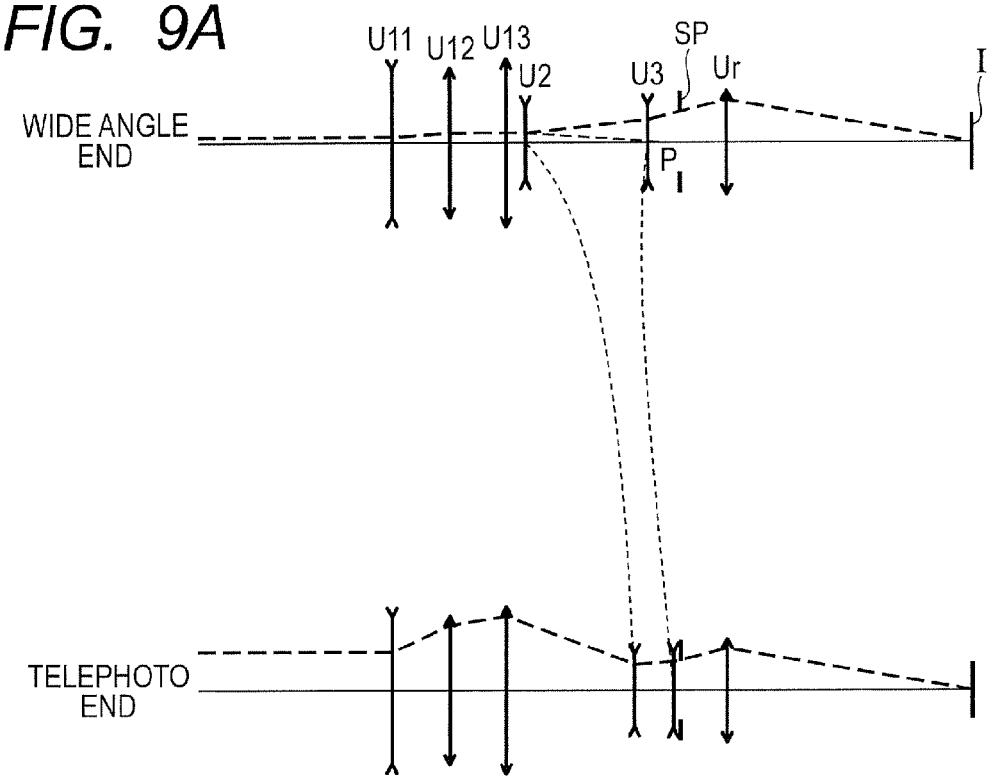
FIG. 9A is a schematic optical path diagram of an object paraxial ray of the zoom lens according to Embodiment 1 of the present invention.
Figure 9B:
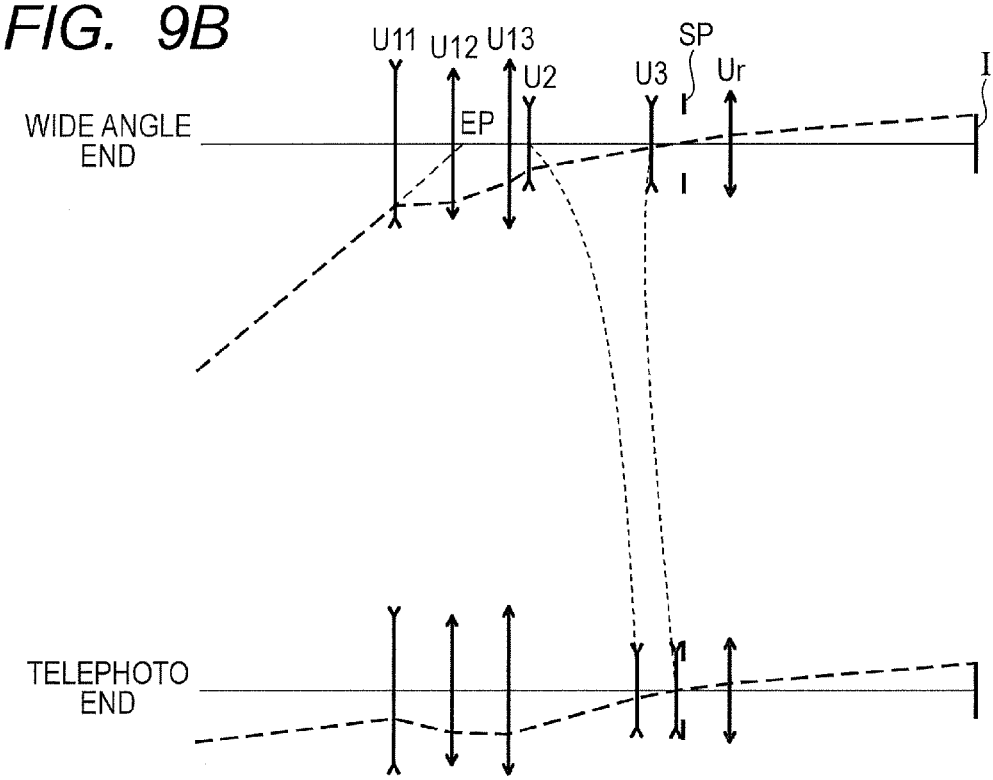
FIG. 9B is a schematic optical path diagram of a pupil paraxial ray of the zoom lens according to Embodiment 1 of the present invention.

Now, a detailed description is rendered with reference to FIG. 9A and FIG. 9B.

FIG. 9A is a schematic optical path diagram of an object paraxial ray in Embodiment 1. For attaining both the reduction in size and weight and the high performance, it is desirable to reduce the focal length f1 of the first lens unit U1. The reason for this is because when the focal length f1 is reduced, the image point position of the first lens unit U1, that is, an object point position P of a second lens unit U2 approaches the second lens unit U2, and hence a stroke amount necessary for the zooming can be reduced.

However, when the focal length f1 is reduced, in order to obtain a focal length fm in a predetermined entire lens system, as shown in the conditional expression (a), the imaging magnification of the lens units closer to the image side than the first lens unit U1 needs to be increased.

$$fm = f1 \times \beta 2m \times \beta 3m \times \beta r \quad (a)$$

where β2m denotes imaging magnification of the second lens unit U2, β3m denotes imaging magnification of a third lens unit U3, and βr denotes imaging magnification of a last lens unit Ur closer to the image side than the aperture stop, which is constant during the zooming.

When the imaging magnification of the lens units closer to the image side than the first lens unit U1 is large, an enlargement factor of the various aberrations generated in the first lens unit U1 and the aberrations generated by the manufacturing variations increases, and hence it becomes difficult to attain the high performance.

From the foregoing, the setting of the focal length of the first lens unit to the appropriate range is necessary for attaining the reduction in size and weight, the high magnification, and the high performance.

When f1/fw in the conditional expression (1) exceeds an upper limit, the focal length of the first lens unit with respect to the wide angle end focal length in the entire lens system becomes too large, and hence it becomes difficult to attain both the reduction in size and weight and the high magnification.

When f1/fw in the conditional expression (1) falls below a lower limit, the focal length of the first lens unit with respect to the wide angle end focal length in the entire lens system becomes too small, and hence it becomes difficult to attain the high performance.

It is more preferred to set the conditional expression (1) as follows.

$$2.8 < f1/fw < 4.2 \quad (1a)$$

The conditional expression (2) defines the ratio of the focal length of the first sub-lens unit to the focal length of the first lens unit, to thereby define the conditions attaining both the reduction in size and weight and the high performance.

FIG. 9B is a schematic optical path diagram of a pupil paraxial ray in Embodiment 1.

For attaining the reduction in size and weight, it is preferred to arrange an incident pupil position EP at the wide angle end on the object side, to thereby reduce a pupil paraxial ray height of a first sub-lens unit U11 to reduce the lens diameter. In order to attain this, it is necessary to reduce the focal length f11 of the first sub-lens unit U11, that is, to increase the refractive power of the first sub-lens unit U11. Moreover, the focal length f11 is reduced, which enables the effect of reducing an extension amount Δx for a focusing point of a second sub-lens unit U12 to be obtained, and hence the size and weight can be further reduced.

However, when the focal length f11 is reduced, the zoom variation of the distortion and the astigmatism which are generated in the first sub-lens unit U11 increases, and hence it becomes difficult to attain the high performance.

From the foregoing, the setting of the focal length of the first sub-lens unit to the appropriate range is necessary for attaining both the reduction in size and weight and the high performance.

When |f11/f1| in the conditional expression (2) exceeds an upper limit, the focal length of the first sub-lens unit with respect to the focal length of the first lens unit becomes too large. Hence, by arranging the incident pupil position at the wide angle end on the image side, the lens diameter of the first sub-lens unit increases, and hence it becomes difficult to attain the reduction in size and weight.

On the other hand, when |f11/f1| in the conditional expression (2) falls below a lower limit, the focal length of the first sub-lens unit with respect to the focal length of the first lens unit becomes too small. Hence, the refractive power of the first sub-lens unit increases, which results in that the zoom variation of the distortion and the astigmatism increases, and hence it becomes difficult to attain the high performance.

It is more preferred to set the conditional expression (2) as follows.

$$0.63 < |f11/f1| < 0.9 \quad (2a)$$

The conditional expression (3) defines the imaging magnification of the last lens unit Ur located closer to the image side than the aperture stop, to thereby define the conditions for attaining both the reduction in size and weight and the high performance.

For attaining the high performance, it is desirable to suppress the zoom variation of the various aberrations which are generated in the movable zoom lens group. In order to attain this, it is necessary to reduce the imaging magnification βr of the last lens unit Ur located closer to the image side than the aperture stop.

Now, when the imaging magnification pr is reduced in the conditional expression (a), the imaging magnification of the movable zoom lens group increases. From this fact, the incident pupil position EP as a conjugate position of the aperture stop is arranged on the image side. For this reason, the pupil paraxial ray height of the first lens unit U1 at the wide angle end increases, and hence the lens diameter also increases.

From the foregoing, it is necessary for attaining both the reduction in size and weight and the high performance to set the imaging magnification of the last lens unit located closer to the image side than the aperture stop to an appropriate range.

When |βr| in the conditional expression (3) exceeds an upper limit, the imaging magnification of the last lens unit located closer to the image side than the aperture stop becomes too large. Hence, the zoom variations of the various aberrations generated in the movable zoom lens group increases. As a result, it becomes difficult to attain the high performance.

On the other hand, when |βr| in the conditional expression (3) falls below a lower limit, the imaging magnification of the last lens unit located closer to the image side than the aperture stop becomes too small. Hence, by arranging the incident pupil position at the wide angle end on the image side, the lens diameter of the first lens unit increases. As a result, it becomes difficult to attain the reduction in size and weight.

In addition, a third sub-lens unit U13 in the zoom lens of the present invention includes at least one negative lens, and at least two positive lenses. In this case, the following conditional expression is satisfied:

$$2.0 < \nu 13pa/\nu 13na < 5.8 \quad (4)$$

where ν13na denotes an average value of the Abbe constants of the negative lenses, and ν13pa denotes an average value of the Abbe constants of the positive lenses.

The conditional expression (4) defines a ratio between the average values of the Abbe constants of the positive lenses and the negative lenses which are included in the third sub-lens unit U13, to thereby define the conditional expression for attaining both the suppression of the various aberrations and the suppression of the chromatic aberration with respect to the d-line having the reference wavelength.

When ν13pa/ν13na in the conditional expression (4) exceeds an upper limit, the Abbe constant of the negative lens becomes too small, and a partial dispersion ratio increases too much. As a result, the secondary spectra of the axial chromatic aberration and the lateral chromatic aberration at the telephoto end become worse.

On the other hand, when ν13pa/ν13na in the conditional expression (4) falls below a lower limit, the refractive powers of the negative lens and the positive lens increase too much for satisfying the conditions for correction of the chromatic aberration, and hence the various aberrations become difficult to correct.

It is more preferred to set the conditional expression (4) as follows.

$$2.4 < \nu13pa/\nu13na < 3.8 \tag{4a}$$

In addition, the first sub-lens unit in the zoom lens of the present invention includes at least two negative lenses, and at least one positive lens. In this case, the following conditional expression is satisfied:

$$2.0 < \nu11na/\nu11pa < 3.6 \tag{5}$$

where ν11na denotes an average value of the Abbe constants of the negative lenses, and ν11pa denotes an average value of the Abbe constants of the positive lenses.

The conditional expression (5) defines a ratio between the average values of the Abbe constants of the positive lenses and the negative lenses which are included in the first sub-lens unit U11, to thereby define the conditional expression for attaining both the suppression of the various aberrations and the suppression of the chromatic aberration with respect to the d-line which is the reference wavelength.

When ν11na/ν11pa in the conditional expression (5) exceeds an upper limit, in the existing optical material, the refractive index of the material of the negative lens becomes too small, and hence the conversion inclination angle in the negative lens increases. Hence, the high-order distortion and the astigmatism are generated.

On the other hand, when ν11na/ν11pa in the conditional expression (5) falls below a lower limit, the refractive powers of the negative lens and the positive lens increase too much for satisfying the conditions for correction of the chromatic aberration, and hence the various aberrations become difficult to correct.

It is more preferred to set the conditional expression (5) as follows:

$$2.2 < \nu11na/\nu11pa < 3.2 \tag{5a}$$

where each of ν11na, ν11pa, ν13na, and ν13pa denotes the Abbe constant νd with the d-line as the reference. In this case, the Abbe constant with the d-line as the reference is defined by Equation below:

$$\nu d = (nd-1)/(nF-nC)$$

where nd denotes a refractive index in the d-line, nC denotes a refractive index in the C-line, and nF denotes a refractive index in the F-line.

As a zoom lens of another embodiment of the present invention, in a zoom lens including, in order from the object side to the image side, the first lens unit having the positive refractive power that does not move for the zooming, the second lens unit having the negative refractive power that moves during the zooming, the third lens unit having the negative refractive power that moves during the zooming, a fourth lens unit having a positive refractive power that moves during the zooming, the aperture stop, and a fifth lens unit having a positive refractive power that does not move for the zooming, it is preferred to satisfy the following conditional expression.

$$0.0 < |\beta r| < 0.5 \tag{3a}$$

Moreover, in an image pickup apparatus including a zoom lens having the features described above, and a solid-state image pickup element having a predetermined effective imaging range for receiving an image formed by the zoom lens, the present invention defines the following condition for effectively utilizing the zoom lens especially:

$$0.4 < fw/IS < 1.2 \tag{6}$$

where IS denotes an image size (which is double the diagonal length of the effective imaging range and the image height of the effective imaging range) of the image pickup element.

When fw/IS in the conditional expression (6) exceeds an upper limit, the focal length fw of the entire lens system at the wide angle end becomes too long.

On the other hand, when fw/IS in the conditional expression (6) falls below a lower limit, the focal length fw of the entire lens system at the wide angle end becomes too short. Hence, an off-axis ray incidence height of the first sub-lens unit U11 increases, and the lens diameter increases in size.

It is more preferred to set the conditional expression (6) as follows.

$$0.5 < fw/IS < 0.7 \tag{6a}$$

Note that, it is preferred that the zooming ratio of the zoom lens at which the zoom lens of the present invention is especially effectively utilized be three times or more.

Embodiment 1

The zoom lens according to Embodiment 1 is concretely described with reference to FIG. 1.

In FIG. 1, the first lens unit U1 is the lens unit having the positive refractive power that does not move for the zooming. The second lens unit U2 is a variator having the negative refractive power that moves during the zooming. The second lens unit U2 monotonously moves to the image plane side on the optical axis, to thereby carry out the zooming from the wide angle end to the telephoto end. The third lens unit U3 is a compensator having the negative refractive power. The third lens unit U3 nonlinearly moves to the image plane side on the optical axis in order to correct the image plane variation following the zooming. The zoom lens includes the aperture stop SP. The last lens unit Ur is the relay lens unit for the imaging having the positive refractive power. An imaging surface I is arranged. The first lens unit U1 includes the first sub-lens unit U11 having the negative refractive power, the second sub-lens unit U12 having the positive refractive power, and the third sub-lens unit U13 having the positive refractive power. The second sub-lens unit U12 described above is moved from the object side to the image side, to thereby carry out the focusing made on a short-distance object.

The first lens unit U1 corresponds to the first to eighteenth surfaces. The first sub-lens unit U11 corresponds to the first to sixth surfaces, and includes two negative lenses and one positive lens. The second sub-lens unit U12 corresponds to the seventh and eighth surfaces. The third sub-lens unit U13 corresponds to the ninth to eighteenth surfaces, and includes two negative lenses and four positive lenses.

The second lens unit U2 corresponds to the nineteenth to twenty-sixth surfaces. The third lens unit U3 corresponds to the twenty-seventh to twenty-ninth surfaces. The last lens unit Ur corresponds to the thirty-first to fiftieth surfaces.

The aspherical surface is used in each of the first lens and the fourth lens. The aspherical surface mainly corrects the zoom variation of the distortion and the astigmatism, and the aberration variation at the focusing.

Table 1 shows values corresponding to the conditional expressions in Embodiment 1. In Numerical Embodiment 1, any of the conditional expressions is satisfied, and hence the zoom lens which has the satisfactory optical performance while the high magnification and the reduction in size and weight are attained is realized.

Embodiment 2

The zoom lens according to Embodiment 2 is concretely described with reference to FIG. 3.

In FIG. 3, the first lens unit U1 is the lens unit having the positive refractive power that does not move for the zooming. The second lens unit U2 is a variator having the negative refractive power that moves during the zooming. The second lens unit U2 monotonously moves to the image plane side on the optical axis, to thereby carry out the zooming from the wide angle end to the telephoto end. The third lens unit U3 is a second variator having a positive refractive power. The third lens unit U3 moves to the image plane side on the optical axis, to thereby carry out the zooming from the wide angle end to the telephoto end. The fourth lens unit U4 is a compensator having a negative refractive power, and nonlinearly moves to the image plane side on the optical axis in order to correct the image plane variation following the zooming. The zoom lens includes the aperture stop SP. The last lens unit Ur is the relay lens unit for the imaging having the positive refractive power. The imaging surface I is arranged. The first lens unit U1 includes the first sub-lens unit U11 having the negative refractive power, the second sub-lens unit U12 having the positive refractive power, and the third sub-lens unit U13 having the positive refractive power. The second sub-lens unit U12 described above is moved from the object side to the image side, to thereby carry out the focusing made on a short-distance object.

The first lens unit U1 corresponds to the first to eighteenth surfaces. The first sub-lens unit U11 corresponds to the first to sixth surfaces, and includes two negative lenses and one positive lens. The second sub-lens unit U12 corresponds to the seventh to eleventh surfaces. The third sub-lens unit U13 corresponds to the twelfth to eighteenth surfaces, and includes one negative lens and three positive lenses.

The second lens unit U2 corresponds to the nineteenth to twenty-second surfaces. The third lens unit U3 corresponds to the twenty-third to twenty-sixth surfaces. The fourth lens unit U4 corresponds to the twenty-seventh to twenty-ninth surfaces. The last lens unit Ur corresponds to the thirty-first to forty-fifth surfaces.

The aspherical surface is used in each of the first lens and the fourth lens. The aspherical surface mainly corrects the zoom variation of the distortion and the astigmatism, and the aberration variation at the focusing.

Table 1 shows values corresponding to the conditional expressions in Embodiment 2. In Numerical Embodiment 2, any of the conditional expressions is satisfied, and hence the zoom lens which has the satisfactory optical performance while the high magnification and the reduction in size and weight are attained is realized.

Embodiment 3

The zoom lens according to Embodiment 3 is concretely described with reference to FIG. 5.

In FIG. 5, the first lens unit U1 is the lens unit having the positive refractive power that does not move for the zooming. The second lens unit U2 is a variator having the negative refractive power that moves during the zooming. The second lens unit U2 monotonously moves to the image plane side on the optical axis, to thereby carry out the zooming from the wide angle end to the telephoto end. The third lens unit U3 is a second variator having a negative refractive power, and carries out the zooming from the wide angle end to the telephoto end. The fourth lens unit U4 is a compensator having a negative refractive power, and nonlinearly moves to the image plane side on the optical axis in order to correct the image plane variation following the zooming. The zoom lens includes the aperture stop SP. The last lens unit Ur is the relay lens unit for the imaging having the positive refractive power. The imaging surface I is arranged. The first lens unit U1 includes the first sub-lens unit U11 having the negative refractive power, the second sub-lens unit U12 having the positive refractive power, and the third sub-lens unit U13 having the positive refractive power. The second sub-lens unit U12 described above is moved from the object side to the image side, to thereby carry out the focusing made on a short-distance object.

The first lens unit U1 corresponds to the first to eighteenth surfaces. The first sub-lens unit U11 corresponds to the first to sixth surfaces, and includes two negative lenses and one positive lens. The second sub-lens unit U12 corresponds to the seventh and eighth surfaces. The third sub-lens unit U13 corresponds to the ninth to eighteenth surfaces, and includes two negative lenses and four positive lenses. The second lens unit U2 corresponds to the nineteenth to twenty-fourth surfaces. The third lens unit U3 corresponds to the twenty-fifth and twenty-sixth surfaces. The fourth lens unit U4 corresponds to the twenty-seventh to twenty-ninth surfaces. The last lens unit Ur corresponds to the thirty-first to forty-sixth surfaces.

The aspherical surface is used in each of the first lens and the fourth lens. The aspherical surface mainly corrects the zoom variation of the distortion and the astigmatism, and the aberration variation at the focusing.

Table 1 shows values corresponding to the conditional expressions in Embodiment 3. In Numerical Embodiment 3, any of the conditional expressions is satisfied, and hence the zoom lens which has the satisfactory optical performance while the high magnification and the reduction in size and weight are attained is realized.

Embodiment 4

The zoom lens according to Embodiment 4 is concretely described with reference to FIG. 7.

In FIG. 7, the first lens unit U1 is the lens unit having the positive refractive power that does not move for the zooming. The second lens unit U2 is a variator having the negative refractive power that moves during the zooming. The second lens unit U2 monotonously moves to the image plane side on the optical axis, to thereby carry out the zooming from the wide angle end to the telephoto end. The third lens unit U3 is a second variator having the negative refractive power, and carries out the zooming from the wide angle end to the telephoto end. The fourth lens unit U4 is a compensator having the positive refractive power, and nonlinearly moves to the image plane side on the optical axis in order to correct the image plane variation following the zooming. The zoom lens includes the aperture stop SP. The last lens unit Ur is the relay lens unit for the imaging having the positive refractive power. The imaging surface I is arranged. The first lens unit U1 includes the first sub-lens unit U11 having the negative refractive power, the second sub-lens unit U12 having the positive refractive power, and the third sub-lens unit U13 having the positive refractive power. The second sub-lens unit U12 described above is moved from the object side to the image side, to thereby carry out the focusing made on a short-distance object.

The first lens unit U1 corresponds to the first to eighteenth surfaces. The first sub-lens unit U11 corresponds to the first to sixth surfaces, and includes two negative lenses and one positive lens. The second sub-lens unit U12 corresponds to the seventh and eighth surfaces. The third sub-lens unit U13 corresponds to the ninth to eighteenth surfaces, and includes two negative lenses and four positive lenses. The second lens unit U2 corresponds to the nineteenth to twenty-sixth surfaces. The third lens unit U3 corresponds to the twenty-seventh to twenty-ninth surfaces. The fourth lens unit U4 corresponds to the thirtieth to thirty-third surfaces. The last lens unit Ur corresponds to the thirty-fifth to forty-eighth surfaces.

The aspherical surface is used in each of the first lens and the fourth lens. The aspherical surface mainly corrects the zoom variation of the distortion and the astigmatism, and the aberration variation at the focusing.

Table 1 shows values corresponding to the conditional expressions in Embodiment 4. In Numerical Embodiment 4, any of the conditional expressions is satisfied. In addition, in the structure of Embodiment 4, βr=−0.22, and hence the conditional expression (3a) is also satisfied. In such a manner, the zoom lens which has the satisfactory optical performance while the high magnification and the reduction in size and weight are attained is realized.

The exemplary embodiments of the present invention are described above, but the present invention is not limited to these embodiments and can be modified and changed variously within the scope of the gist thereof. Although, for example, in Embodiment 2 to Embodiment 4, the image plane variation caused by the zooming is corrected with the fourth lens unit, it goes without saying that the present invention is established even when the correction is made with any of the second lens unit, the third lens unit, and the fourth lens unit.

Figure 10:
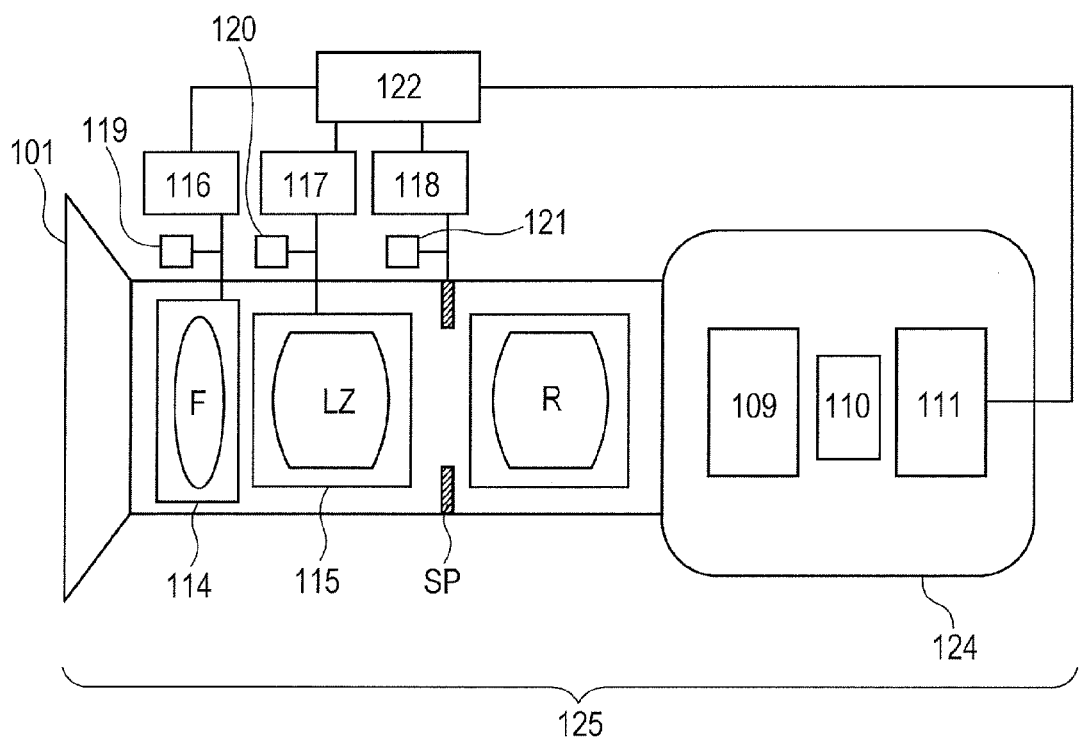
FIG. 10 is a schematic view of a main part of an image pickup apparatus of the present invention.

FIG. 10 is a schematic diagram of a main part of an image pickup apparatus (television camera system) using the zoom lens according to each of Embodiments 1 to 4 of the present invention as a photographing optical system. In FIG. 10, an image pickup apparatus 125 includes a zoom lens 101 according to any one of Embodiments 1 to 4, and a camera 124. The zoom lens 101 is removably mounted to the camera 124. The camera 124 having the zoom lens 101 mounted thereon constitutes the image pickup apparatus 125. The zoom lens 101 includes a first lens unit F, a zoom portion LZ, an aperture stop SP, and a lens unit R for imaging. The first lens unit F includes a lens unit for focusing. Drive mechanisms 114 and 115, such as a helicoid and a cam, drive the first lens unit F and the zoom portion LZ in an optical axis direction, respectively. Motors (drive units) 116 to 118 electrically drive the drive mechanisms 114 and 115 and the aperture stop SP.

Detectors 119 to 121, such as an encoder, a potentiometer, or a photo-sensor, are configured to detect the positions of the first lens unit F and the zoom portion LZ on the optical axis, and the aperture diameter of the aperture stop SP. The camera 124 includes a glass block 109, which corresponds to an optical filter or a color separation optical system provided within the camera 124. Further, the camera 124 includes a solid-state image pickup element (photoelectric transducer) 110, such as a charge-coupled device (CCD) sensor or a complementary metal-oxide semiconductor (CMOS) sensor. The solid-state image pickup element 110 is configured to receive a subject image formed by the zoom lens 101. Further, central processing units (CPUs) 111 and 122 control the driving of the camera 124 and the zoom lens 101.

By applying the zoom lens according to the present invention to a television camera as described above, an image pickup apparatus having high optical performance may be realized.

Next, Numerical Embodiments 1 to 4 corresponding to Embodiments 1 to 4 of the present invention are shown below. In each of the numerical embodiments, symbol "i" represents the order of a surface from the object side, symbol "ri" represents a radius of curvature of an i-th surface from the object side, symbol "di" represents an interval between the i-th surface and the (i+1)th surface from the object side, and symbols "ndi" and "vdi" respectively represent a refractive index and an Abbe constant of the optical material of the i-th surface. The focal length, the F-number, and the angle of field represent values when focused on the infinity object. Symbol BF is a distance from the final surface of the lens to the image plane.

Note that, the aspherical shape is expressed by the following expression:

$$x=(y^2/R)/\{1+(1-k\cdot y^2/R^2)^{0.5}\}+A4\cdot y^4+A6\cdot y^6+A8\cdot y^8+A10\cdot y^{10}+A12\cdot y^{12}$$

where x represents a coordinate in the optical axis direction, y represents a coordinate in a direction perpendicular to the optical axis, R represents a standard radius of curvature, k represents a conic constant, and An represents an n-th order aspherical coefficient, provided that "e-x" means "×10$^{-x}$". Note that, the lens surfaces having the aspherical surfaces are marked with asterisks (*) on the right side of surface numbers in the tables.

Numerical Embodiment 1

| Unit mm | | | | |
|---|---|---|---|---|
| Surface data | | | | |
| i | ri | di | ndi | vdi | Effective diameter |
|---|---|---|---|---|---|
| 1* | 230.634 | 3.00 | 1.77250 | 49.6 | 88.27 |
| 2 | 42.785 | 29.54 | | | 69.60 |
| 3 | −81.327 | 2.40 | 1.77250 | 49.6 | 67.89 |
| 4 | 253.731 | 0.63 | | | 70.15 |
| 5 | 152.980 | 6.97 | 1.95906 | 17.5 | 71.98 |
| 6 | −1363.977 | 0.93 | | | 72.45 |
| 7 | 171.683 | 11.17 | 1.60311 | 60.6 | 75.01 |
| 8* | −119.665 | 4.80 | | | 75.24 |
| 9 | 289.766 | 10.63 | 1.49700 | 81.5 | 74.30 |
| 10 | −121.912 | 2.40 | 1.84666 | 23.8 | 73.96 |
| 11 | −179.990 | 0.15 | | | 74.07 |
| 12 | 135.831 | 2.20 | 1.84666 | 23.8 | 71.31 |

-continued

Unit mm

| | | | | | |
|---|---|---|---|---|---|
| 13 | 55.886 | 13.26 | 1.43875 | 94.9 | 67.69 |
| 14 | 490.455 | 0.15 | | | 67.35 |
| 15 | 189.444 | 6.24 | 1.43387 | 95.1 | 67.25 |
| 16 | −460.145 | 0.15 | | | 67.32 |
| 17 | 196.655 | 8.96 | 1.77250 | 49.6 | 67.62 |
| 18 | −133.427 | (Variable) | | | 67.43 |
| 19 | 55.041 | 1.00 | 2.00100 | 29.1 | 33.94 |
| 20 | 23.647 | 6.99 | | | 29.92 |
| 21 | −74.271 | 1.00 | 1.72916 | 54.7 | 29.82 |
| 22 | 65.150 | 3.00 | | | 29.09 |
| 23 | 42.793 | 6.54 | 1.78472 | 25.7 | 29.21 |
| 24 | −52.868 | 0.69 | | | 28.61 |
| 25 | −41.519 | 1.00 | 1.83481 | 42.7 | 28.42 |
| 26 | −2429.214 | (Variable) | | | 27.79 |
| 27 | −47.481 | 1.00 | 1.72916 | 54.7 | 27.05 |
| 28 | 196.255 | 2.71 | 1.92286 | 18.9 | 28.28 |
| 29 | −525.842 | (Variable) | | | 28.88 |
| 30 (Stop) | ∞ | 1.46 | | | 34.40 |
| 31 | 533.292 | 5.59 | 1.60311 | 60.6 | 35.35 |
| 32 | −47.782 | 0.15 | | | 35.89 |
| 33 | 70.982 | 7.73 | 1.48749 | 70.2 | 35.93 |
| 34 | −45.653 | 1.00 | 2.00069 | 25.5 | 35.63 |
| 35 | −292.209 | 0.15 | | | 36.03 |
| 36 | 34.078 | 5.98 | 1.58913 | 61.1 | 36.46 |
| 37 | 198.440 | 25.02 | | | 35.85 |
| 38 | −612.903 | 1.00 | 1.88300 | 40.8 | 22.63 |
| 39 | 27.609 | 4.32 | 1.92286 | 18.9 | 21.74 |
| 40 | −97.230 | 3.05 | | | 21.33 |
| 41 | −39.345 | 1.00 | 2.00069 | 25.5 | 19.35 |
| 42 | 32.927 | 1.64 | | | 18.99 |
| 43 | 56.013 | 3.83 | 1.48749 | 70.2 | 20.05 |
| 44 | −49.782 | 8.94 | | | 21.08 |
| 45 | 46.857 | 6.88 | 1.48749 | 70.2 | 28.99 |
| 46 | −40.009 | 0.15 | | | 29.31 |
| 47 | 75.878 | 8.17 | 1.48749 | 70.2 | 28.80 |
| 48 | 12752.683 | 2.19 | | | 28.43 |
| 49 | −50.658 | 1.00 | 1.84666 | 23.8 | 28.39 |
| 50 | −136.174 | 46.02 | | | 28.63 |
| Image plane | | | | | |

Aspherical surface data

First surface

K = 3.77301e+000  A4 = 3.05128e−007  A6 = 1.87256e−010
A8 = −1.41108e−013  A10 = 4.60119e−017  A12 = −6.36153e−021

Eighth surface

K = −3.64841e+000  A4 = 3.34659e−007  A6 = 7.99224e−011
A8 = −5.42827e−014  A10 = 1.99335e−017  A12 = −5.62220e−021

Various data
Zoom ratio 7.00

| | Wide angle | Intermediate | Telephoto |
|---|---|---|---|
| Focal length | 17.00 | 51.00 | 119.00 |
| F-number | 2.80 | 2.80 | 3.40 |
| Angle of field | 41.04 | 16.18 | 7.09 |
| Image height | 14.80 | 14.80 | 14.80 |
| Total lens length | 325.03 | 325.03 | 325.03 |
| BF | 46.02 | 46.02 | 46.02 |
| d18 | 0.80 | 41.30 | 58.60 |
| d26 | 51.59 | 8.60 | 7.16 |
| d29 | 14.87 | 17.35 | 1.49 |
| Incident pupil position | 49.30 | 88.38 | 135.35 |
| Exit pupil position | −130.84 | −130.84 | −130.84 |
| Front principal point position | 64.67 | 124.67 | 174.28 |
| Rear principal point position | 29.02 | −4.98 | −72.98 |

Zoom lens unit data

| Unit | First surface | Focal length | Lens structure length | Front principal point position | Rear principal point position |
|---|---|---|---|---|---|
| 1 | 1 | 55.00 | 103.59 | 62.54 | 42.93 |
| 2 | 19 | −32.20 | 20.22 | 1.79 | −13.90 |
| 3 | 27 | −79.64 | 3.71 | −0.33 | −2.31 |
| 4 | 30 | 52.82 | 84.24 | 24.67 | −84.56 |

Numerical Embodiment 2

Unit mm

Surface data

| i | ri | di | ndi | vdi | Effective diameter |
|---|---|---|---|---|---|
| 1* | 267.080 | 3.00 | 1.77250 | 49.6 | 86.66 |
| 2 | 41.114 | 28.67 | | | 67.47 |
| 3 | −74.586 | 2.40 | 1.81600 | 46.6 | 65.95 |
| 4 | 459.103 | 0.71 | | | 68.35 |
| 5 | 176.175 | 6.67 | 1.92286 | 18.9 | 70.53 |
| 6 | −568.391 | 0.88 | | | 70.98 |
| 7 | 179.309 | 9.90 | 1.60311 | 60.6 | 73.22 |
| 8* | −124.956 | 4.50 | | | 73.43 |
| 9 | 385.960 | 9.71 | 1.49700 | 81.5 | 73.49 |
| 10 | −137.992 | 2.40 | 1.72047 | 34.7 | 73.43 |
| 11 | −203.813 | 4.21 | | | 73.67 |
| 12 | 120.092 | 2.20 | 1.84666 | 23.8 | 72.01 |
| 13 | 59.106 | 14.59 | 1.43875 | 94.9 | 69.72 |
| 14 | −1189.630 | 0.15 | | | 69.96 |
| 15 | 454.731 | 8.87 | 1.43387 | 95.1 | 70.15 |
| 16 | −125.886 | 0.15 | | | 70.39 |
| 17 | 1899.488 | 6.27 | 1.77250 | 49.6 | 69.73 |
| 18 | −138.362 | (Variable) | | | 69.60 |
| 19 | 79.289 | 1.00 | 2.00100 | 29.1 | 34.12 |
| 20 | 29.921 | 5.95 | | | 31.06 |
| 21 | −83.341 | 1.00 | 1.77250 | 49.6 | 30.97 |
| 22 | 74.836 | (Variable) | | | 30.43 |
| 23 | 65.499 | 6.24 | 1.73800 | 32.3 | 31.16 |
| 24 | −51.493 | 0.64 | | | 30.83 |
| 25 | −42.801 | 1.00 | 1.49700 | 81.5 | 30.70 |
| 26 | 1030.031 | (Variable) | | | 29.75 |
| 27 | −34.872 | 1.00 | 1.59522 | 67.7 | 29.04 |
| 28 | 59.288 | 4.14 | 1.92286 | 18.9 | 31.62 |
| 29 | 16227.561 | (Variable) | | | 32.08 |
| 30 (Stop) | ∞ | 1.50 | | | 34.92 |
| 31 | 231.328 | 4.75 | 1.77250 | 49.6 | 35.93 |
| 32 | −81.378 | 0.15 | | | 36.29 |
| 33 | 55.958 | 8.17 | 1.60311 | 60.6 | 36.13 |
| 34 | −51.482 | 1.00 | 2.00069 | 25.5 | 35.58 |
| 35 | −288.996 | 17.37 | | | 35.35 |
| 36 | 25.939 | 7.42 | 1.52249 | 59.8 | 29.65 |
| 37 | −132.690 | 0.15 | | | 28.42 |
| 38 | 66.214 | 1.00 | 1.61340 | 44.3 | 25.81 |
| 39 | 19.917 | 3.79 | | | 22.92 |
| 40 | 26.606 | 6.40 | 1.49700 | 81.5 | 21.55 |
| 41 | −25.131 | 0.70 | 2.00069 | 25.5 | 20.22 |
| 42 | 58.140 | 17.64 | | | 19.41 |
| 43 | 107.134 | 1.00 | 1.88300 | 40.8 | 25.44 |
| 44 | 25.809 | 6.48 | 1.80518 | 25.4 | 25.89 |
| 45 | −86.801 | 46.02 | | | 26.24 |
| Image plane | ∞ | | | | |

-continued

| Unit mm |
| --- |

Aspherical surface data

First surface

| | | |
|---|---|---|
| K = 2.85714e+001 | A4 = 4.77690e−007 | A6 = 6.21095e−011 |
| A8 = −1.74465e−013 | A10 = 8.53308e−017 | A12 = −2.19711e−020 |

Eighth surface

| | | |
|---|---|---|
| K = −5.64629e+000 | A4 = 4.25413e−007 | A6 = 8.68166e−011 |
| A8 = −6.00335e−014 | A10 = 7.56688e−018 | A12 = −7.67527e−022 |

Various data
Zoom ratio 6.85

| | Wide angle | Intermediate | Telephoto |
|---|---|---|---|
| Focal length | 17.50 | 50.99 | 119.80 |
| F-number | 2.80 | 2.80 | 3.46 |
| Angle of field | 40.22 | 16.18 | 7.04 |
| Image height | 14.80 | 14.80 | 14.80 |
| Total lens length | 330.05 | 330.05 | 330.05 |
| BF | 46.02 | 46.02 | 46.02 |
| d18 | 0.69 | 48.62 | 69.17 |
| d22 | 8.87 | 7.99 | 1.10 |
| d26 | 55.59 | 9.29 | 8.65 |
| d29 | 15.10 | 14.35 | 1.34 |
| Incident pupil position | 47.90 | 87.31 | 136.24 |
| Exit pupil position | −104.59 | −104.59 | −104.59 |
| Front principal point position | 63.36 | 121.04 | 160.74 |
| Rear principal point position | 28.52 | −4.97 | −73.78 |

Zoom lens unit data

| Unit | First surface | Focal length | Lens structure length | Front principal point position | Rear principal point position |
|---|---|---|---|---|---|
| 1 | 1 | 60.00 | 105.30 | 65.55 | 52.76 |
| 2 | 19 | −23.28 | 7.95 | 3.54 | −3.14 |
| 3 | 23 | 72.66 | 7.88 | 0.05 | −4.81 |
| 4 | 27 | −87.38 | 5.14 | −0.30 | −3.07 |
| 5 | 30 | 52.63 | 77.52 | 19.39 | −73.90 |

Numerical Embodiment 3

| Unit mm |
| --- |

Surface data

| i | ri | di | ndi | vdi | Effective diameter |
|---|---|---|---|---|---|
| 1* | 216.287 | 3.00 | 1.77250 | 49.6 | 90.03 |
| 2 | 39.958 | 28.38 | | | 68.64 |
| 3 | −79.457 | 2.40 | 1.77250 | 49.6 | 68.05 |
| 4 | 225.141 | 2.65 | | | 70.16 |
| 5 | 161.710 | 7.92 | 1.95906 | 17.5 | 72.94 |
| 6 | −539.120 | 1.05 | | | 73.51 |
| 7 | 192.358 | 11.71 | 1.60311 | 60.6 | 75.48 |
| 8* | −110.902 | 5.81 | | | 75.64 |
| 9 | 7672.240 | 9.44 | 1.49700 | 81.5 | 73.90 |
| 10 | −102.536 | 2.40 | 1.84666 | 23.8 | 73.69 |
| 11 | −174.749 | 0.15 | | | 74.13 |
| 12 | 171.919 | 2.20 | 1.84666 | 23.8 | 72.51 |
| 13 | 60.157 | 13.86 | 1.43875 | 94.9 | 69.69 |
| 14 | 494.129 | 0.15 | | | 70.43 |
| 15 | 196.393 | 6.20 | 1.43387 | 95.1 | 71.15 |
| 16 | −1430.611 | 0.15 | | | 71.44 |
| 17 | 217.892 | 10.62 | 1.77250 | 49.6 | 71.96 |
| 18 | −110.503 | (Variable) | | | 71.85 |
| 19 | 156.195 | 1.00 | 2.00100 | 29.1 | 38.36 |
| 20 | 32.989 | 7.04 | | | 34.61 |
| 21 | −76.134 | 1.00 | 1.72916 | 54.7 | 34.55 |
| 22 | 130.038 | 2.33 | | | 34.46 |
| 23 | 61.404 | 7.31 | 1.78472 | 25.7 | 35.06 |
| 24 | −56.016 | (Variable) | | | 34.71 |
| 25 | −43.041 | 1.00 | 1.83481 | 42.7 | 32.72 |
| 26 | −113.471 | (Variable) | | | 32.52 |
| 27 | −46.947 | 1.00 | 1.72916 | 54.7 | 29.64 |
| 28 | 142.105 | 2.80 | 1.92286 | 18.9 | 31.04 |
| 29 | −2478.248 | (Variable) | | | 31.55 |
| 30 (Stop) | ∞ | 1.46 | | | 32.34 |
| 31 | −1036.033 | 4.54 | 1.69680 | 55.5 | 33.03 |
| 32 | −45.818 | 0.15 | | | 33.51 |
| 33 | 80.552 | 7.96 | 1.48749 | 70.2 | 33.49 |
| 34 | −44.216 | 1.00 | 2.00069 | 25.5 | 33.06 |
| 35 | −162.325 | 0.15 | | | 33.41 |
| 36 | 29.403 | 4.90 | 1.58913 | 61.1 | 33.43 |
| 37 | 89.616 | 23.68 | | | 32.84 |
| 38 | 1339.409 | 1.00 | 1.88300 | 40.8 | 20.50 |
| 39 | 42.722 | 3.25 | 1.92286 | 18.9 | 19.87 |
| 40 | −81.385 | 2.24 | | | 19.43 |
| 41 | −39.062 | 1.00 | 2.00069 | 25.5 | 17.84 |
| 42 | 27.764 | 1.78 | | | 17.77 |
| 43 | 36.649 | 5.56 | 1.48749 | 70.2 | 19.94 |
| 44 | −35.620 | 0.19 | | | 21.24 |
| 45 | 37.586 | 5.38 | 1.48749 | 70.2 | 22.86 |
| 46 | 461.019 | 46.00 | | | 23.15 |
| Image plane | ∞ | | | | |

Aspherical surface data

First surface

| | | |
|---|---|---|
| K = 1.42580e+001 | A4 = 3.20378e−007 | A6 = 2.73143e−010 |
| A8 = −2.36261e−013 | A10 = 8.45351e−017 | A12 = −1.42141e−020 |

Eighth surface

| | | |
|---|---|---|
| K = −2.82711e+000 | A4 = 2.89625e−007 | A6 = 7.90882e−011 |
| A8 = −5.24416e−014 | A10 = 2.04781e−017 | A12 = −6.59106e−021 |

Various data
Zoom ratio 5.62

| | Wide angle | Intermediate | Telephoto |
|---|---|---|---|
| Focal length | 16.00 | 50.02 | 89.97 |
| F-number | 2.80 | 2.80 | 2.80 |
| Angle of field | 42.77 | 16.48 | 9.34 |
| Image height | 14.80 | 14.80 | 14.80 |
| Total lens length | 320.00 | 320.00 | 320.00 |
| BF | 46.00 | 46.00 | 46.00 |
| d18 | 0.80 | 51.76 | 68.30 |
| d24 | 2.47 | 5.87 | 4.97 |
| d26 | 63.70 | 9.31 | 3.49 |
| d29 | 11.24 | 11.27 | 1.45 |
| Incident pupil position | 46.85 | 83.44 | 108.47 |
| Exit pupil position | −61.37 | −61.37 | −61.37 |
| Front principal point position | 60.46 | 110.16 | 123.05 |
| Rear principal point position | 30.00 | −4.02 | −43.98 |

Zoom lens unit data

| Unit | First surface | Focal length | Lens structure length | Front principal point position | Rear principal point position |
|---|---|---|---|---|---|
| 1 | 1 | 60.00 | 108.08 | 66.96 | 60.34 |
| 2 | 19 | −173.71 | 18.68 | −37.70 | −67.28 |
| 3 | 25 | −83.14 | 1.00 | −0.33 | −0.88 |
| 4 | 27 | −72.58 | 3.80 | −0.11 | −2.14 |
| 5 | 30 | 40.84 | 64.23 | 7.11 | −52.76 |

Numerical Embodiment 4

Unit mm

Surface data

| i | ri | di | ndi | vdi | Effective diameter |
|---|---|---|---|---|---|
| 1* | 163.934 | 2.80 | 1.77250 | 49.6 | 89.87 |
| 2 | 44.357 | 35.43 | | | 72.09 |
| 3 | −74.618 | 2.20 | 1.77250 | 49.6 | 67.75 |
| 4 | 887.034 | 0.20 | | | 69.87 |
| 5 | 165.380 | 5.49 | 1.95906 | 17.5 | 71.70 |
| 6 | 2707.548 | 2.00 | | | 71.96 |
| 7 | 189.079 | 11.31 | 1.60311 | 60.6 | 73.61 |
| 8* | −130.305 | 5.65 | | | 73.72 |
| 9 | −313.808 | 7.59 | 1.49700 | 81.5 | 72.14 |
| 10 | −94.201 | 2.00 | 1.84666 | 23.8 | 72.10 |
| 11 | −128.244 | 0.20 | | | 72.70 |
| 12 | 103.683 | 2.00 | 1.84666 | 23.8 | 71.04 |
| 13 | 57.648 | 14.41 | 1.43875 | 94.9 | 68.91 |
| 14 | 25974.572 | 0.20 | | | 69.00 |
| 15 | 357.371 | 8.06 | 1.49700 | 81.5 | 69.08 |
| 16 | −132.098 | 0.20 | | | 69.02 |
| 17 | 115.350 | 6.58 | 1.77250 | 49.6 | 65.81 |
| 18 | 2477.781 | (Variable) | | | 64.91 |
| 19 | 47.911 | 1.20 | 2.00100 | 29.1 | 32.40 |
| 20 | 23.020 | 6.40 | | | 28.61 |
| 21 | −77.738 | 0.90 | 1.72916 | 54.7 | 28.53 |
| 22 | 48.075 | 1.65 | | | 27.55 |
| 23 | 38.030 | 5.86 | 1.78472 | 25.7 | 27.63 |
| 24 | −53.202 | 0.70 | | | 27.14 |
| 25 | −39.870 | 0.90 | 1.83481 | 42.7 | 27.02 |
| 26 | 850.377 | (Variable) | | | 26.39 |
| 27 | −31.703 | 0.90 | 1.72916 | 54.7 | 26.42 |
| 28 | 141.854 | 2.45 | 1.92286 | 18.9 | 28.66 |
| 29 | −468.181 | (Variable) | | | 29.29 |
| 30 | 3711.178 | 4.89 | 1.69680 | 55.5 | 32.47 |
| 31 | −58.164 | 0.15 | | | 33.51 |
| 32 | 249.761 | 4.03 | 1.58913 | 61.1 | 34.55 |
| 33 | −119.290 | (Variable) | | | 34.87 |
| 34 (Stop) | ∞ | 1.46 | | | 35.02 |
| 35 | 344.213 | 5.92 | 1.48749 | 70.2 | 35.13 |
| 36 | −40.823 | 1.20 | 2.00069 | 25.5 | 35.15 |
| 37 | −89.075 | 0.42 | | | 35.98 |
| 38 | 45.950 | 5.17 | 1.58913 | 61.1 | 36.48 |
| 39 | 396.671 | 30.97 | | | 36.01 |
| 40 | 69.997 | 0.80 | 2.00069 | 25.5 | 24.34 |
| 41 | 24.686 | 5.55 | 1.48749 | 70.2 | 23.38 |
| 42 | −83.696 | 2.37 | | | 23.15 |
| 43 | 25.291 | 4.43 | 1.92286 | 18.9 | 21.66 |
| 44 | −288.786 | 0.80 | 2.00100 | 29.1 | 21.02 |
| 45 | 25.778 | 2.41 | | | 20.02 |
| 46 | 46.632 | 4.26 | 1.49700 | 81.5 | 20.27 |
| 47 | −38.567 | 0.80 | 2.00100 | 29.1 | 20.20 |
| 48 | −928.490 | 46.01 | | | 20.43 |
| Image plane | ∞ | | | | |

Aspherical surface data

First surface

K = 4.94774e+000  A4 = 1.63648e−007  A6 = −8.59936e−012
A8 = −2.11218e−015  A10 = −7.22054e−019  A12 = −4.44198e−022

Eighth surface

K = −2.43470e+000  A4 = 2.38022e−007  A6 = −2.79910e−011
A8 = 2.48574e−014  A10 = −2.40771e−017  A12 = 6.24794e−021

Various data
Zoom ratio 6.80

| | Wide angle | Intermediate | Telephoto |
|---|---|---|---|
| Focal length | 17.50 | 50.16 | 118.91 |
| F-number | 2.80 | 2.79 | 3.36 |
| Angle of field | 40.22 | 16.44 | 7.09 |
| Image height | 14.80 | 14.80 | 14.80 |

Unit mm

| | | | |
|---|---|---|---|
| Total lens length | 315.03 | 315.03 | 315.03 |
| BF | 46.01 | 46.01 | 46.01 |
| d18 | 2.02 | 41.12 | 59.95 |
| d26 | 47.42 | 12.01 | 4.49 |
| d29 | 6.67 | 8.61 | 0.81 |
| d33 | 10.01 | 4.37 | 0.87 |
| Incident pupil position | 53.51 | 92.45 | 146.35 |
| Exit pupil position | −44.81 | −44.81 | −44.81 |
| Front principal point position | 67.64 | 114.91 | 109.57 |
| Rear principal point position | 28.51 | −4.15 | −72.90 |

Zoom lens unit data

| Unit | First surface | Focal length | Lens structure length | Front principal point position | Rear principal point position |
|---|---|---|---|---|---|
| 1 | 1 | 56.00 | 106.31 | 66.23 | 42.88 |
| 2 | 19 | −29.24 | 17.61 | 3.37 | −9.66 |
| 3 | 27 | −51.06 | 3.35 | −0.22 | −2.02 |
| 4 | 30 | 51.71 | 9.07 | 3.55 | −2.03 |
| 5 | 34 | 77.41 | 66.56 | −4.19 | −48.78 |

Correspondences between the embodiments and the conditional expressions described above are shown in Table 1.

Table 1 Values corresponding to conditional expressions in Numerical Embodiments 1 to 4

TABLE 1

| | | Embodiment | | | |
|---|---|---|---|---|---|
| | | 1 | 2 | 3 | 4 |
| | fw | 17.00 | 17.50 | 16.00 | 17.50 |
| | f1 | 55.00 | 60.00 | 60.00 | 56.00 |
| | f11 | −45.00 | −42.00 | −44.60 | −48.17 |
| | βr | −1.47 | −1.28 | −1.42 | −0.22 |
| | IS | 28.20 | 28.20 | 28.20 | 28.20 |
| | v11na | 49.60 | 48.11 | 49.60 | 49.60 |
| | v11pa | 17.47 | 18.90 | 17.47 | 17.47 |
| | v13na | 23.78 | 29.24 | 23.78 | 23.78 |
| | v13pa | 80.29 | 80.29 | 80.29 | 76.90 |
| Conditional Expression | | | | | |
| (1) | f1/fw | 3.24 | 3.43 | 3.75 | 3.20 |
| (2) | |f11/f1| | 0.82 | 0.70 | 0.74 | 0.86 |
| (3) | |βr| | 1.47 | 1.28 | 1.42 | 0.22 |
| (4) | v13pa/v13na | 3.38 | 2.75 | 3.38 | 3.23 |
| (5) | v11na/v11pa | 2.84 | 2.55 | 2.84 | 2.84 |
| (6) | fw/IS | 0.60 | 0.62 | 0.57 | 0.62 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-234392, filed Nov. 12, 2013, which is hereby incorporated by reference herein in its entirety.

What is claimed is:
1. A zoom lens, comprising, in order from an object side to an image side:
a first lens unit having a positive refractive power that does not move for zooming, the first lens unit comprising a first sub-lens unit having a negative refractive power, a second sub-lens unit having a positive refractive power that moves during adjustment of a focal point, and a third sub-lens unit having a positive refractive power;

a lens group including at least two lens units that move during zooming;

an aperture stop; and a last lens unit having a positive refractive power that does not move for zooming, wherein the following conditional expressions are satisfied:

$$2.6 < f1/fw < 4.5$$

$$0.6 < |f11/f1| < 0.9$$

$$0.0 < |\beta r| < 1.5$$

where fw denotes a focal length at a wide angle end of the zoom lens, f1 denotes a focal length of the first lens unit, f11 denotes a focal length of the first sub-lens unit, and βr denotes imaging magnification of the last lens unit, wherein the third sub-lens unit comprises at least one negative lens, and at least two positive lenses, wherein the following conditional expression is satisfied:

$$2.0 < v13pa/v13na < 5.8$$

where v13na denotes an average value of an Abbe constant with a d-line as a reference of the at least one negative lens, and v13pa denotes an average value of Abbe constants with the d-line as the reference of the positive lenses, and wherein an Abbe constant vd with the d-line as the reference is defined by the following equation, $$vd = (nd-1)/(nF-nC)$$

where nd denotes a refractive index in the d-line, nC denotes a refractive index in a C-line, and nF denotes a refractive index in an F-line.

2. A zoom lens according to claim 1,
wherein the first sub-lens unit comprises at least two negative lenses, and at least one positive lens, and wherein the following conditional expression is satisfied:

$$2.0 < v11na/v11pa < 3.6$$

where v11na denotes an average value of Abbe constants with the d-line as the reference of the at least two negative lenses, and v11pa denotes an average value of an Abbe constant with the d-line as the reference of the at least one positive lens.

3. A zoom lens according to claim 1, wherein the lens group comprises, in order from the object side to the image side, a second lens unit having a negative refractive power that moves during zooming, a third lens unit having a negative refractive power that moves during the zooming.

4. A zoom lens according to claim 1, wherein the lens group comprises, in order from the object side to the image side:
a second lens unit having a negative refractive power that moves during zooming,
a third lens unit having a positive refractive power that moves during the zooming; and
a fourth lens unit having a negative refractive power that moves during the zooming.

5. A zoom lens according to claim 1, wherein the lens group comprises, in order from the object side to the image side:
a second lens unit having a negative refractive power that moves during zooming,
a third lens unit having a negative refractive power that moves during the zooming; and
a fourth lens unit having a negative refractive power that moves during the zooming.

6. A zoom lens according to claim 1,
wherein the lens group comprises, in order from the object side to the image side: a second lens unit having a negative refractive power that moves during zooming, a third lens unit having a negative refractive power that moves during the zooming; and a fourth lens unit having a positive refractive power that moves during the zooming, and wherein the following expression is satisfied, $$0.0 < |\beta r| < 0.5.$$

7. An image pickup apparatus, comprising a zoom lens,
wherein the zoom lens comprises, in order from an object side to an image side:
a first lens unit having a positive refractive power that does not move for zooming, the first lens unit comprising a first sub-lens unit having a negative refractive power, a second sub-lens unit having a positive refractive power that moves during adjustment of a focal point, and a third sub-lens unit having a positive refractive power;

a lens group including at least two lens units that move during zooming;

an aperture stop; and a last lens unit having a positive refractive power that does not move for zooming, wherein the following conditional expressions are satisfied:

$$2.6 < f1/fw < 4.5$$

$$0.6 < |f11/f1| < 0.9$$

$$0.0 < |\beta r| < 1.5$$

where fw denotes a focal length at a wide angle end of the zoom lens, f1 denotes a focal length of the first lens unit, f11 denotes a focal length of the first sub-lens unit, and βr denotes imaging magnification of the last lens unit, wherein the third sub-lens unit comprises at least one negative lens, and at least two positive lenses, wherein the following conditional expression is satisfied:

$$2.0 < v13pa/v13na < 5.8$$

where v13na denotes an average value of an Abbe constant with a d-line as a reference of the at least one negative lens, and v13pa denotes an average value of Abbe constants with the d-line as the reference of the at least two positive lenses, and wherein an Abbe constant vd with the d-line as the reference is defined by the following equation:

$$vd = (nd-1)/(nF-nC)$$

where nd denotes a refractive index in the d-line, nC denotes a refractive index in a C-line, and nF denotes a refractive index in an F-line.

8. An image pickup apparatus according to claim 7, wherein the following conditional expression is satisfied:

$$0.4 < fw/IS < 1.2$$

where IS denotes an image size of the image pickup apparatus.

* * * * *